United States Patent
Ishii et al.

(10) Patent No.: US 7,649,823 B2
(45) Date of Patent: Jan. 19, 2010

(54) METHOD FOR RECORDING ASYNCHRONOUSLY PRODUCED DIGITAL DATA CODES, RECORDING UNIT USED FOR THE METHOD, METHOD FOR REPRODUCING THE DIGITAL DATA CODES, PLAYBACK UNIT USED FOR THE METHOD AND INFORMATION STORAGE MEDIUM

(75) Inventors: Jun Ishii, Hamamatsu (JP); Haruki Uehara, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 590 days.

(21) Appl. No.: 10/923,410

(22) Filed: Aug. 20, 2004

(65) Prior Publication Data

US 2005/0018581 A1    Jan. 27, 2005

Related U.S. Application Data

(62) Division of application No. 09/837,103, filed on Apr. 18, 2001, now Pat. No. 7,206,272.

(30) Foreign Application Priority Data

Apr. 20, 2000  (JP)  ............... 2000-119978
Apr. 20, 2000  (JP)  ............... 2000-119979

(51) Int. Cl.
  *G11B 5/09*  (2006.01)
  *G11B 11/00* (2006.01)
(52) U.S. Cl. ............... 369/59.23; 369/59.24; 369/47.19
(58) Field of Classification Search ............. 369/59.24, 369/47.19, 47.21, 59.23, 30.04, 124.03, 53.21; 386/111, 112, 95, 70, 125, 126; 375/259, 375/240.01
See application file for complete search history.

(56) References Cited

U.S. PATENT DOCUMENTS

| 4,397,017 A | 8/1983 | Rokugo |
| 4,523,323 A | 6/1985 | Nakajima et al. |
| 4,816,928 A | 3/1989 | Sasaki et al. |
| 4,819,088 A | 4/1989 | Higurashi |
| 4,847,703 A | 7/1989 | Sakata et al. |
| 4,942,551 A | 7/1990 | Klappert et al. |

(Continued)

FOREIGN PATENT DOCUMENTS

EP    0 277 000 A2    8/1988

(Continued)

OTHER PUBLICATIONS

Notice of Grounds of Rejection for Japanese Patent Application No. JP2000-119978, mailed Oct. 28, 2008 (8 pages).

(Continued)

*Primary Examiner*—Hoa T Nguyen
*Assistant Examiner*—Kim-Kwok Chu
(74) *Attorney, Agent, or Firm*—Morrison & Foerster LLP

(57) ABSTRACT

A recording and reproducing system is broken down into a recording unit for producing a digital audio data signal from MIDI music data words asynchronously produced at irregular intervals and a playback unit for reproducing the MIDI music data codes from the digital audio data signal, wherein synchronous data nibbles are supplemented in the irregular intervals among the MIDI music data words for producing a data stream, and the digital audio data signal is produced from the data stream through a differential phase shift keying and a phase code modulation so as to record the MIDI messages in a digital versatile disk at high dense.

6 Claims, 31 Drawing Sheets

U.S. PATENT DOCUMENTS

| | | |
|---|---|---|
| 5,054,359 A | 10/1991 | Hikawa |
| 5,337,199 A | 8/1994 | Arai et al. |
| 5,455,684 A * | 10/1995 | Fujinami et al. ............ 386/111 |
| 5,574,949 A | 11/1996 | Tsurumi |
| 5,612,943 A | 3/1997 | Moses et al. |
| 5,933,430 A | 8/1999 | Osakabe et al. |
| 6,009,237 A * | 12/1999 | Hirabayashi et al. ........ 386/111 |
| 7,206,272 B2 | 4/2007 | Ishii et al. |

FOREIGN PATENT DOCUMENTS

| | | |
|---|---|---|
| EP | 0 762 684 A2 | 3/1997 |
| JP | 51-84615 | 7/1976 |
| JP | 58-141059 | 8/1983 |
| JP | 59-74757 | 4/1984 |
| JP | 01-178171 | 7/1989 |
| JP | 1-178171 | 7/1989 |
| JP | 02-193192 A | 7/1990 |
| JP | 4-79588 | 3/1992 |
| JP | 05-224669 A | 9/1993 |
| JP | 6-197138 | 7/1994 |
| JP | 06-268954 | 9/1994 |
| JP | 07-029176 | 1/1995 |
| JP | 08-022674 | 1/1996 |
| JP | 08-153368 | 6/1996 |
| JP | 09-185369 A | 7/1997 |
| WO | WO 00/02357 | 1/2000 |

OTHER PUBLICATIONS

Midiman/QRS CD Keyboard Player Instructions, U.S. Appl. No. 09/837,103.

Japanese Office Action, mailed 2004, U.S. Appl. No. 09/837,103.

European Search Report mailed Sep. 13, 2001 for Application No. 01109775.5-2210.

Notice of Grounds of Rejection for JP Patent Application No. 2000-119978 with English translation, 13 pages

* cited by examiner

| ITEM | DESIGN | UNIT | NOTE |
|---|---|---|---|
| Recording channel for modulated signal | R | Channel | Other channels ar used for audio signal. |
| Bit rate | 25.2 | kbps (kilobits/sec.) | Corresponding to 31.25 kbps in MIDI standards |
| Carrier frequency | 6.30 | KHz | |
| Symbol Velocity | 6.30 | kbps (kilobits/sec.) | 3.15 kbps is available for low-performance recorder or transmission line. |
| Bits of Symbol | 4 | bits/symbol | |
| Coding | 4-bit gray code | | |
| Modulation | 16 DPSK | | |
| Demodulation | Synchronous detection | | |
| Synchronization | Synchronous nibble | | |
| Delay time of audio signal in recording | 0 | msec | |
| Delay time of audio signal in playback | 500 | msec | |
| Recording Level | -6.0 to -12.0 | dB | Relative value with respect to full range. |
| Silent period before tune. | 2.0 ≦ | second | Necessary for symchronization. |

Fig. 2

| BIT STRING OF STATUS BYTE BEFORE DATA CONVERSION | BIT STRING AFTER DATA CONVERSION | DEFINITION OF STATUS BYTE |
|---|---|---|
| C0 | C40 | PROGRAM CHANGE AT CHANNEL 0 |
| C1 | C41 | PROGRAM CHANGE AT CHANNEL 1 |
| C2 | C42 | PROGRAM CHANGE AT CHANNEL 2 |
| ⋮ | ⋮ | ⋮ |
| CF | C4F | PROGRAM CHANGE AT CHANNEL F |
| F0 | C0 | EXCLUSIVE |
| F1 | C1 | TIME CODE QUARTER FRAME |
| F2 | C2 | SONG POSITION POINTER |
| F3 | C3 | SONG SELECT |
| F4 | C54 | ( NOT DEFINED ) |
| F5 | C55 | ( NOT DEFINED ) |
| F6 | C6 | TUNE REQUEST |
| F7 | C7 | END OF EXCLUSIVE |
| F8 | C8 | TIMING CLOCK |
| F9 | C9 | ( NOT DEFINED ) |
| FA | CA | START |
| FB | CB | CONTINUE |
| FC | CC | STOP |
| FD | CD | ( NOT DEFINED ) |
| FE | CE | ACTIVE SENSING |
| FF | CF | SYSTEM REQUEST |

Fig. 5

| Gray Code Data | POSITION [Dec] | PHASE [rad] | I – COMPONENT | Q – COMPONENT |
|---|---|---|---|---|
| 1000 | 0 | 0 | 1 | 0 |
| 1010 | 1 | 0.392699 | 0.92388 | 0.382683 |
| 1110 | 2 | 0.785398 | 0.707107 | 0.707107 |
| 0110 | 3 | 1.178097 | 0.382683 | 0.92388 |
| 0010 | 4 | 1.570796 | 0 | 1 |
| 0011 | 5 | 1.963495 | -0.38268 | 0.92388 |
| 0111 | 6 | 2.356194 | -0.70711 | 0.707107 |
| 1111 | 7 | 2.748894 | -0.92388 | 0.382683 |
| 1011 | 8 | 3.141593 | -1 | 0 |
| 1001 | 9 | 3.534292 | -0.92388 | -0.38268 |
| 1101 | 10 | 3.926991 | -0.70711 | -0.70711 |
| 0101 | 11 | 4.31969 | -0.38268 | -0.92388 |
| 0001 | 12 | 4.712389 | 0 | -1 |
| 0000 | 13 | 5.105088 | 0.382683 | -0.92388 |
| 0100 | 14 | 5.497787 | 0.707107 | -0.70711 |
| 1100 | 15 | 5.890486 | 0.92388 | -0.38268 |

Fig 20

| ITEM | DESIGN | UNIT | NOTE |
|---|---|---|---|
| Recording channel for modulated signal | R | Channel | L channel is used for audio signal. |
| Bit rate | 25.2 | kbps (kilobits/sec.) | Corresponding to 31.25 kbps in MIDI standards |
| Carrier frequency | 6.30 | KHz | |
| Symbol Velocity | 6.30 | kbps (kilobits/sec.) | 3.15 kbps is available for low-performance recorder or transmission line. |
| Bits of Symbol | 4 | bits/symbol | |
| Coding | 4-bit gray code | | |
| Modulation | 16 DPSK | | |
| Demodulation | Synchronous detection | | |
| Synchronization | Synchronous nibble | | |
| Delay time of audio signal in recording | 0 | msec | |
| Delay time of audio signal in playback | 500 | msec | |
| Recording Level | -6.0 to -12.0 | dB | Relative value with respect to full range. |
| Silent period before tune. | 2.0 ≦ | second | Necessary for synchronization. |

Fig. 30

METHOD FOR RECORDING ASYNCHRONOUSLY PRODUCED DIGITAL DATA CODES, RECORDING UNIT USED FOR THE METHOD, METHOD FOR REPRODUCING THE DIGITAL DATA CODES, PLAYBACK UNIT USED FOR THE METHOD AND INFORMATION STORAGE MEDIUM

CROSS-REFERENCE TO RELATED APPLICATION

This application is a division of application Ser. No. 09/837,103 filed on Apr. 18, 2001, which application is specifically incorporated herein, in its entirety, by reference.

FIELD OF THE INVENTION

This invention relates to recording/playback technologies for asynchronously produced digital data codes, more particularly, to a method for recording asynchronously produced digital data codes in an information storage medium, a recorder used therein, a method for reproducing the asynchronously produced digital codes from the information storage medium, a playback unit used therein and an information storage medium for storing a digital signal containing pieces of asynchronously produced data information.

DESCRIPTION OF THE RELATED ART

A typical example of the information storage medium for digital data information is a compact disk, which is usually abbreviated as "CD". The compact disk used for recording music is abbreviated as "CD-DA" (Compact Disk-Digital-Audio). The MIDI (Music Instrument Digital Interface) standards are popular to musicians. A piece of music is converted to a set of digital music data codes through the MIDI standards. If the CD-DA is available for the piece of music represented by the MIDI digital music data codes, it is convenient to the musician. The MIDI digital data codes represent messages, i.e., channel messages and system messages, and the messages are asynchronously produced in a MIDI musical instrument. Plural data bytes, i.e., 8-bit data codes are used for representing the message, and are hereinbelow referred to as "MIDI digital music data codes".

The MIDI digital music data codes are to be transmitted at 31.25 kilobits per second. On the other hand, a digital audio signal or a series of digital audio data codes is recorded in the CD-DA at higher speed by means of a recorder, which is hereinbelow referred to as "disk recording unit". An analog audio signal is supplied to the disk recording unit, and the disk recording unit converts an analog audio signal to the digital audio signal before the recording. The analog audio signal is sampled at 44.1 kHz, and the discrete values are quantized into a series of digital audio data codes. The discrete value is represented by 16 bits. Thus, the analog audio signal is converted to the series of digital audio signal synchronously with the sampling clock, and the digital audio data codes are transmitted to the recording head at the bit rate much larger than the bit rate for the MIDI digital music data codes.

In order to record the MIDI digital music data codes into the CD-DA, it is necessary to produce the digital audio signal or the series of digital audio data codes through an analog audio signal. The following procedure may be required for the data conversion. The 8-bit MIDI digital music data code is represented by a pulse train or a series of marks and spaces. The 8-bit data codes are modulated through a frequency shift keying, and the frequency modulated signal serves as an analog audio signal. The analog audio signal is sampled at the high frequency, and the discrete values are converted to a series of digital audio data codes through the pulse code modulation. The digital audio data signal is transmitted to the recording head, and is recorded into an information storage medium such as the CD-DA. Although the frequency shift keying is applicable to a small amount of music data information representative of a simple performance, it is impossible to produce the analog audio signal from a large amount of MIDI digital music data codes representative of a complicated performance. Moreover, when the performance is reproduced from the series of digital audio data codes, it is necessary to reproduce the clock signal. It is difficult to reproduce the clock signal from the digital audio signal, because the analog audio signal was produced through the frequency shift keying.

A DVD (Digital Versatile Disk) is another kind of information storage medium for digital data. In other words, the DVD is available for pieces of MIDI data information. Pieces of digital data are recorded in and reproduced from the DVD through a record/playback system, and an analog audio signal is converted to a series of digital data codes before recording into the DVD. The recording/playback procedure may be similar to the above-described procedure, and the problem is also encountered in the record/playback system.

SUMMARY OF THE INVENTION

It is therefore an important object of the present invention to provide recording and reproducing technologies for asynchronously produced digital codes.

The object of the present invention is accomplished by providing a method for discriminatingly recording asynchronously produced digital codes in an information storage medium, a recording unit used in the recording method, a method for reproducing asynchronously produced digital codes from an information storage medium, a playback unit used in the reproducing method and an information storage medium in which asynchronously produced digital codes are discriminatingly stored.

In accordance with one aspect of the present invention, there is provided a method for recording digital data codes representative of pieces of data information and asynchronously produced at irregular intervals in an information storage medium comprising the steps of a) supplementing synchronous data codes representative of meaninglessness from the aspect of definitions of the pieces of data information in the irregular intervals among the digital data codes for producing a data stream, b) converting the digital data codes and the synchronous data codes to an analog data signal storing the pieces of data information and the meaninglessness through a differential phase shift keying and c) recording the pieces of data information and the meaninglessness in an information storage medium.

In accordance with another aspect of the present invention, there is provided a recording apparatus for recording digital data codes representative of pieces of data information and asynchronously produced at irregular intervals in an information storage medium, and the recording apparatus comprises a data converting, unit supplied with the digital data codes and supplementing synchronous data codes representative of meaninglessness from the aspect of definitions of the pieces of data information into the irregular intervals among the digital data codes for producing a data stream and a signal demodulation unit connected to the data converting unit and producing an analog data signal representative of the pieces of data information and the meaninglessness from the data stream through a differential phase shift keying.

In accordance with yet another aspect of the present invention, there is provided an information storage medium having a plurality of recording channels partially used for recording pieces of data information represented by digital data codes asynchronously produced at irregular intervals and pieces of information representative of meaninglessness from the aspect of definitions of the pieces of data information and partially for other pieces of data information represented by a data signal.

In accordance with still another aspect of the present invention, there is provided a method for reproducing digital codes at irregular intervals from pieces of data information and pieces of meaningless information stored in an information storage medium comprising the steps of a) producing an analog data signal from the pieces of data information and the pieces of meaningless information, b) converting the analog data signal to a data stream containing the digital codes and synchronous data codes representative of the pieces of meaningless information and c) eliminating the synchronous data codes from the data stream so as to leaving the digital data codes representative of the pieces of data information at the irregular intervals.

In accordance with yet another aspect of the present invention, there is provided a playback apparatus for producing digital data codes at irregular intervals from pieces of data information and pieces of meaningless information stored in an information storage medium comprising a signal demodulating unit supplied with an analog data signal carrying the pieces of data information and the pieces of meaningless information and producing a data stream containing the digital data codes and synchronous data codes representative of the pieces of meaningless information and a data converter connected to the signal demodulating unit and eliminating the synchronous data codes from the data stream so as to leave the digital data codes representative of the pieces of data information at the irregular intervals.

BRIEF DESCRIPTION OF THE DRAWINGS

The features and advantages of the recording method, the recording unit, the modulator, the reproducing method, the playback unit, the demodulator and the information storage medium will be more clearly understood from the following description taken in conjunction with the accompanying drawings in which:

FIG. 2 is a view showing a specification for the recording and reproducing system;

FIG. 5 is a view showing the relation stored in a data conversion table incorporated in the data converting module;

FIG. 20 is a view showing relation among gray codes, positions assigned to the gray codes, a relative phase and an I-Q coordinate system;

FIG. 30 is a view showing a specification for the recording and reproducing system;

DESCRIPTION OF THE PREFERRED EMBODIMENTS

First Embodiment

System Configuration

Figure 1:
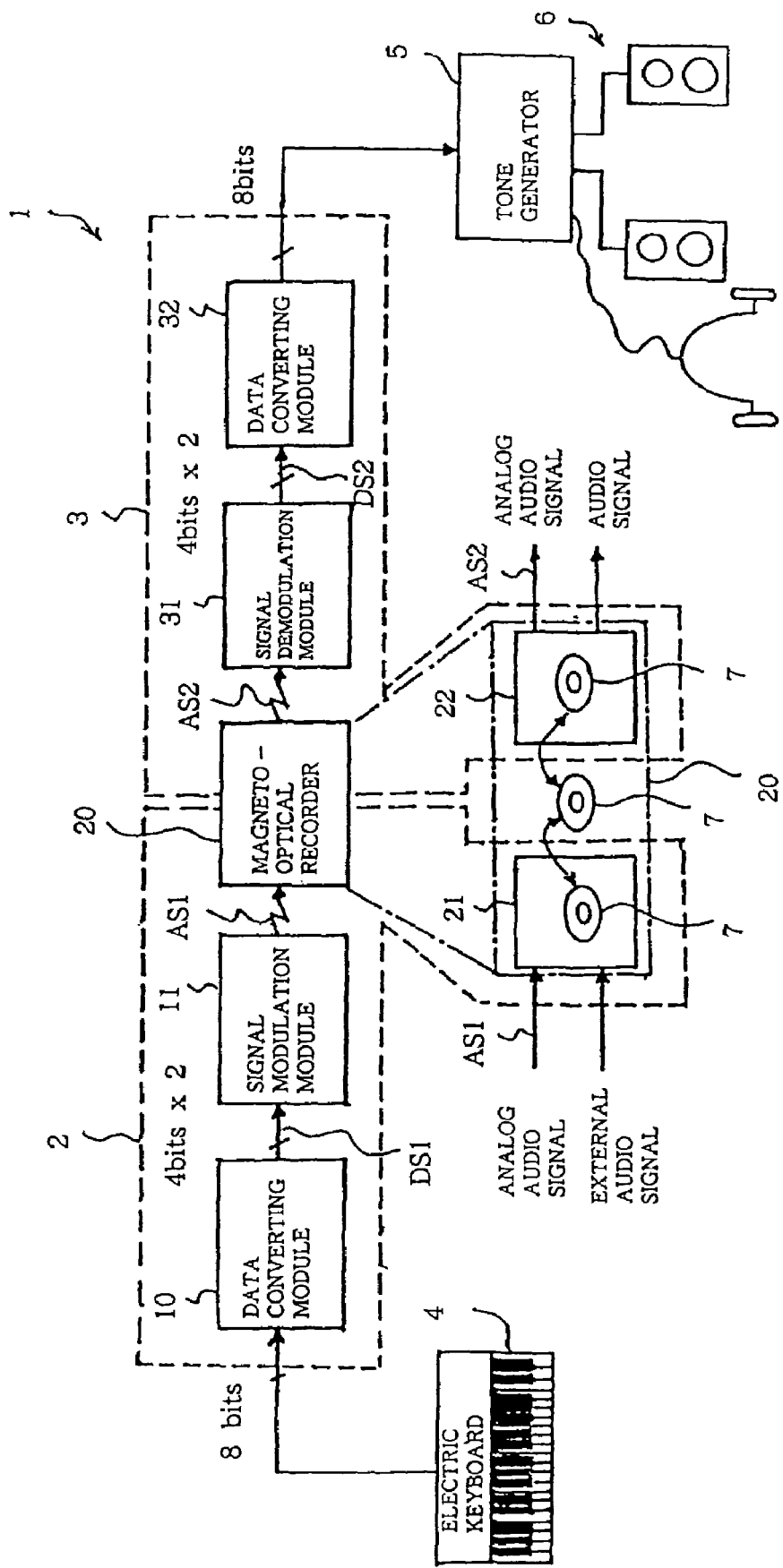
FIG. 1 is a block diagram showing the circuit configuration of a recording and reproducing system according to the present invention.

Referring to FIG. 1 of the drawings, a recording and reproducing system embodying the present invention is designated at its entirety by reference numeral 1. The recording and reproducing system 1 may be implemented by a personal computer system and computer programs. In this instance, the computer programs are loaded into the personal computer system through a suitable information storage medium or a communication network.

The recording and reproducing system 1 is broken down into a recording unit 2 and a playback unit 3. A data source is connected to the recording unit 2, and an electric keyboard 4 is an example of the data source. The playback unit 3 is connected to a tone generator 5, and a sound system 6 is connected to the tone generator 5. A DVD-R (Digital Versatile Disk Recordable) or DVD-RW (Digital Versatile Disk Rewritable) is used as an information storage medium, and the DVD-R and the DVD-RW are hereinbelow referred to as "DVD disk". The DVD disk is labeled with reference numeral 7 in FIG. 1.

The electric keyboard 4 serves as a data source, and generates MIDI messages in response to the fingering on the keyboard. According to the MIDI standards, the MIDI messages are stored in 8-bit data codes. Plural 8-bit data codes are required for transferring each MIDI message. In other words, each MIDI message is represented by using a status byte and data bytes. The status byte is, by way of example, representative of an instruction such as a note-on/note-off and a channel to be assigned. Each of the note-on/note-off and the channel to be assigned are represented by higher 4 bits and lower 4 bits. Thus, the nibble is the unit of the MIDI data word. On the other hand, the data bytes give details of the instruction. The number of data bytes is predetermined for each of the status bytes in the MIDI standards. The status byte representative of a note-on is followed by two data bytes. The first data byte B2 is indicative of the pitch of the tone to be generated, and the second data byte is indicative of the loudness of the tone to be generated. Thus, the MIDI message M is representative of the instruction for generating the tone with the pitch [3C] at the loudness [64]. In the following description, a set of status/data bytes representative of a MIDI message is referred to as "MIDI data word", and the status byte and the data byte defined in the MIDI standards are referred to as "MIDI status byte" and "MIDI data byte", respectively.

While a musician is playing a tune on the electric keyboard 4, the electric keyboard 4 generates tones in response to the keys depressed by the musician, and produces the MIDI data words representative of the performance. This means that the performance is reproducible from the set of MIDI data words. However, the tones are not produced at regular intervals. Accordingly, the MIDI data words are asynchronously transferred from the electric keyboard 4 to the recording unit 2. Although the recording unit 2 receives the MIDI data words at irregular intervals, the recording unit 2 supplements a 4-bit synchronous code or codes between the MIDI data words so as to output a data stream DS1, and, thereafter, produces an analog audio data signal AS1 from the data stream DS1 through a modulation to a carrier signal in the audio frequency band. The nibble is the unit data length of the data stream DS1. All the data nibbles forming parts of the MIDI data words are to be discriminative from the synchronous data nibble. The pieces of MIDI music data information are stored in the data stream DS1, and any start bit and any stop bit are never required for each of the MIDI data words. This results in the data transmission at higher bit rate. The recording unit 2 converts the analog audio data signal AS1 to a digital audio data signal or a series of digital data codes representative of discrete values of the analog audio data signal AS1, and the series of digital data codes is written in one of the recording channels of the DVD disk 7. Thus, the pieces of music data information representative of the performance are stored in the recording channel of the DVD disk 7.

The playback unit 3 reproduces the MIDI data words. The series of digital data codes is read out from the DVD disk 7, and an analog audio data signal AS2 is reproduced from the series of digital data codes. The playback unit 3 further restores a data stream DS2 from the analog audio data signal AS2 through a signal demodulation, and removes the synchronous data nibble from the data stream DS2 for extracting the MIDI data words. The playback unit 3 supplies the MIDI data words to the tone generator 5 at irregular intervals, and the tone generator 5 produces an analog audio signal from the MIDI data words. The audio signal is supplied from the tone generator 5 to the sound system 6, and electronic tones are radiated from the sound system 6.

The specification for the recording and reproducing system 1 is summarized in FIG. 2 of the drawings. As shown in FIG. 2, the digital audio data signal is recorded in one of the recording channels of the DVD disk 7. Two formats are prepared for the DVD disk 7. These formats are called as "video format" and "audio format".

When the video format is selected, one stream of video data and eight streams of audio data are stored in the DVD disk 7 at the maximum. The stream of video data information is compressed through a data compression technique such as MPEG2 (Moving Picture Coding Experts Group). As to the recording technology for the audio data information, the audio data information is recorded through a linear PCM (Pulse Code Modulation) without data compression or one of the compressed Dolby Digital (trademark) and MPEG Audio. If the linear PCM is selected, the sampling clock frequency is 48 kHz or 96 kHz, and each discrete value is quantized to a 16-bit data code, 20-bit data code or 24-bit data code. The maximum bit rate is 6.14 MBPS.

On the other hand, when the audio format is selected, the specifications are prepared for two objects, the audio object and the video object. The audio object is mainly used in reproduction of audio signals, and the video object is appropriate to reproduction of both of a video signal and an audio signal. As to the recording technologies for an audio signal in the audio object, the linear PCM or the compressed PCM is employable. The audio signal is sampled at 48 kHz, 96 kHz, 192 kHz, 44.1 kHz, 88.2 kHz or 176.4 kHz, and each discrete value is converted to a 16-bit data code, 20-bit data code or 24-bit data code. If the sampling clock frequency is 48 kHz, 96 kHz, 44.1 kHz or 88.2 kHz, six channels are available for the digital audio signal at the maximum. On the other hand, if the sampling clock frequency is 192 kHz or 176.4 kHz, the maximum channels are reduced to two. The bit rate is maximized at 9.6 MBPS. On the other hand, when selecting the video object, the linear PCM or the compressed PCM is also employable. The sampling clock frequency is 48 kHz or 96 kHz, and each discrete value is stored in a 16-bit data code, 20-bit data code or 24-bit data code. The digital data signal is stored in eight channels at the maximum, and the maximum bit rate is 6.144 MBPS.

In this instance, the audio object in the audio format is selected for the DVD disk 7. The analog audio signal AS1 is sampled at 44.1 kHz, and each discrete value is stored in the 16-bit data code as similar to the music CD (Compact Disk). The maximum channels are six. One of the six channels is assigned to the digital audio data signal, and the remaining channels are available for the external audio signal.

Although the bit rate and the symbol velocity are 25.2 kbps and 6.30 kbaud in the table shown in FIG. 2, the bit rate of 12.6 kbps and the symbol velocity of 3.15 kbaud are also employed in other products.

Recording Unit

Turning back to FIG. 1 of the drawings, the recording unit 2 includes a data converting module 10, a signal modulation module 11 and a data write-in section 21 of a magneto-optical recorder 20. The electric keyboard 4 is connected through a MIDI cable to the data converter 10, and the series of MIDI data words is supplied to the data converter 10. The data converting module 10 supplements the synchronous data nibble or nibbles to the interval between the MIDI data words, and produces the data stream DS1. The signal modulation module 11 is connected to the data converting module 10, and, accordingly, the data stream DS1 is supplied from the data converting module 10 to the signal modulation module 11.

Using the nibble as a symbol, the signal modulation module 11 produces the analog audio data signal from the data stream DS1 through a differential phase-shift keying. In detail, the signal modulation module 11 firstly converts the nibbles of the data stream DS1 to a modulating signal, and modulates the carrier signal in the audio frequency band with the modulating signal for producing the analog audio data signal AS1. The analog audio data signal AS1 is supplied from the signal modulation module 11 to the data write-in section 21.

The data write-in section 21 forms the magneto-optical recorder 20 together with a data read-out section 22, which is incorporated in the playback unit 3 as will be described in conjunction with the playback unit 3. However, the data write-in section 21 is integrated with the data read-out section 22. The data write-in section 21 and the data read-out section 22 are obtained as the magneto-optical recorder 20.

The data write-in section 21 includes a pulse code modulation circuit, a disk driver and a disk controller. The DVD disk 7 is loaded into and unloaded from the disk driver. The analog audio signal AS1 is supplied to the pulse code modulation circuit. An external analog audio signal and/or an external digital audio signal is also supplied from an external signal source (not shown) to the pulse code modulation circuit, and pieces of voice data information are stored in another audio channel of the DVD disk 7. The pulse code modulation circuit samples the analog audio signal AS1 in response to a sampling clock signal, and produces the series of digital data codes from the series of discrete values. The pulse code modulating circuit assigns binary numbers to the discrete values, and produces the digital audio data signal. The disk controller cooperates with the disk driver, and the series of digital data codes are written into the predetermined channel of the DVD disk 7. The data write-in section 21 similarly behaves for the external audio signal, and stores a series of digital data codes in another recording channel in the DVD disk 7. Upon completion of the recording, the DVD disk 7 may be taken out from the magneto-optical recorder 20. If the DVD disk 7 is inserted into another compact disk driver, the external audio signal is, by way of example, restored from the series of digital data codes, and the voice and/or a piece of music is produced from an associated sound system.

Playback Unit

The playback unit 3 includes the data read-out section 22 of the magneto-optical recorder 20, a signal demodulation module 31 and a data restoration module 32. The data read-out section 22 reads out the pieces of MIDI music data information from the recording channel of the DVD disk 7, and restores the analog audio signal AS2 from the series of digital data codes in the recording channel. When the data read-out section 22 trances the other recording channel, the series of digital data codes, which is corresponding to the external analog audio signal, is reproduced, and is converted to an analog audio signal. The analog audio signal is supplied to the outside thereof.

The analog audio data signal AS2 is supplied from the data read-out section 22 to the signal demodulation module 31, and the data stream DS2 is restored through the demodulation. In the signal demodulation module 31, the clock is extracted from the analog audio data signal AS2, and the bit string are restored for the synchronous data nibbles and the MIDI data words. The data stream DS2 is supplied from the signal demodulation module 31 to the data converting module 32, and the synchronous data nibbles are eliminated from the data stream DS2. The data converting module 32 restores the MIDI music data words, and the MIDI music data words are supplied to the tone generator 5.

The analog audio data signal AS2 is ought to be identical with the analog audio data signal AS1. However, difference tends to take place due to the cut-off band and the phase fluctuation. In order to minimize the difference, the magneto-optical recorder has to be appropriately selected from candidates in consideration the frequency characteristics and the phase characteristics such as the group delay characteristics. Another kind of recorder such as, for example, a magnetic recorder is available for the recording and reproducing system 1 in so far as it exhibits good linearity in the frequency characteristics and the phase characteristics.

Data Converting Modules

Figure 3:
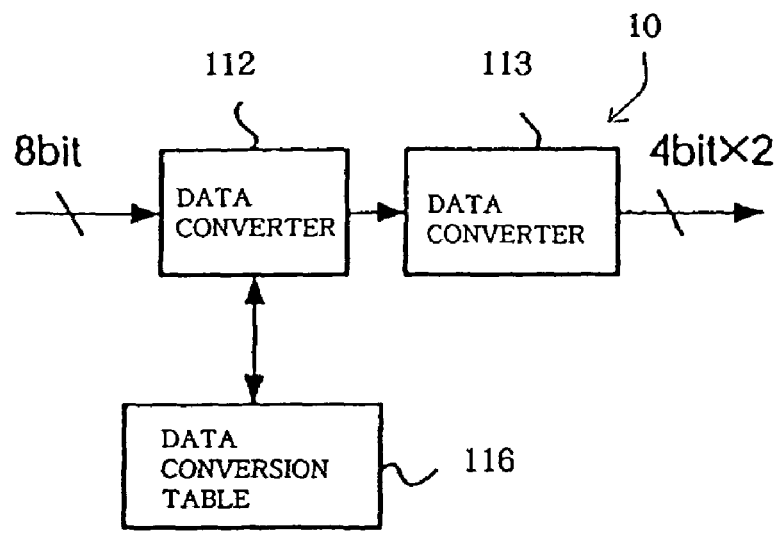
FIG. 3 is a block diagram showing the function of a data converting module incorporated in a recording unit of the recording and reproducing system.

The data converting modules 10 and 32 are detailed hereinbelow with reference to FIGS. 3 to 19. Referring first to FIG. 3 of the drawings, the function of the data converting module is equivalent to functions of two data converters 112/113 associated with a data conversion table 116. MIDI music data words are asynchronously produced in the electric keyboard 4, and are supplied from the electric keyboard 4 to the data converting module 10 at irregular intervals. The data converter 112 checks the MIDI music data words to see whether or not any one of the MIDI status bytes contains a nibble to be confused with the synchronous data nibble or a nibble forming a part of another MIDI status byte. If the MIDI status byte does not contain the synchronous data nibble and the confusing nibble, the answer is given negative, and the data converter 112 passes the MIDI status byte and associated MIDI data bytes to the data converter 113. However, if the MIDI status byte contains the synchronous data nibble or the confusing nibble, the answer is given affirmative, and the data converter 112 accesses the data conversion table, and searches the data conversion table 116 for the MIDI status byte. When the data converter 112 finds the MIDI status byte in the data conversion table 116, the data converter 112 fetches a quasi MIDI status code corresponding to the MIDI status byte, and supplies the quasi MIDI status code and the MIDI data bytes to the data converter 113. The data converter 113 supplements the synchronous data nibble or nibbles in the intervals between the MIDI data words, and produces the data stream DS1.

Figure 4:
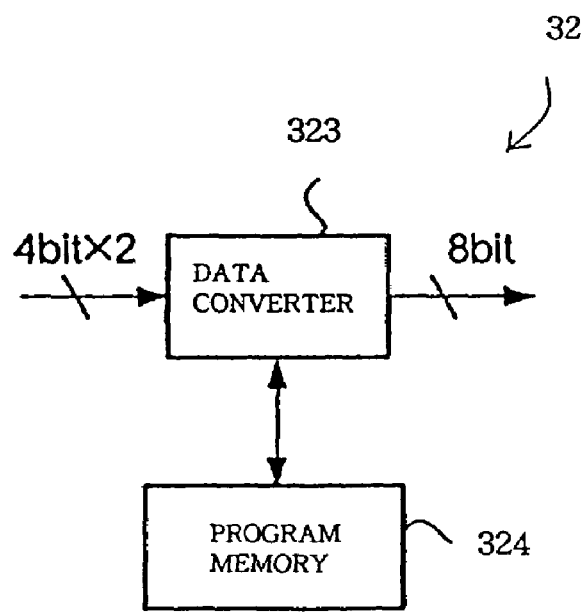
FIG. 4 is a block diagram showing the function of a data converting module incorporated in a playback unit of the recording and reproducing system.

On the other hand, the data converting module 32 is equivalent to a data converter 323 accompanied with a program memory 324 as shown in FIG. 4. The data converter 323 is implemented by a data processor, and the data processor runs on a computer program stored in the program memory 324 for restoring the MIDI data words. The data converter 323 checks the data stream DS2 to see whether or not any one of the nibbles is identical in bit string with the synchronous data nibble. If the nibble is identical in bit string with the synchronous data nibble, the data converter 323 ignores the nibble, and, accordingly, the synchronous data nibbles are eliminated from the data stream DS2. The data converter 323 further checks the data stream DS2 to see whether or not any one of the nibbles is identical in bit string with the nibble forming a part of the quasi MIDI status code. If the answer is given negative, the data converter 323 determines the number of the MIDI data bytes, and integrates the MIDI status byte with the MIDI data bytes for reproducing the MIDI music data word. On the other hand, if the answer is given affirmative, the data converter 323 replaces the nibble with an appropriate nibble so as to restore the MIDI status byte. The data converter 323 determines the number of MIDI data bytes, and integrates the MIDI status byte with the MIDI data bytes for reproducing the MIDI music data word.

FIG. 5 shows the data conversion table 116. The data conversion table 116 is stored in a memory device. The data conversion table 116 defines a relation between MIDI status bytes and quasi MIDI status codes. Although the quasi MIDI status codes are different from the MIDI standards, the quasi MIDI status codes carry the pieces of status data information stored in the corresponding MIDI status bytes between the data converter 112 and the data converter 323. The data conversion table 116 includes the rightmost column assigned to the definition of status byte in the MIDI standards in FIG. 5. The actual data conversion table 116 only relates the most significant nibbles of the particular MIDI status bytes to the quasi MIDI status codes. Namely, the rightmost column is for the sake of reference. When the MIDI status bytes are respectively replaced with the quasi MIDI status codes, the quasi MIDI status codes form the quasi MIDI music data words together with the associated MIDI data bytes. In the following description, hexadecimal numbers are respectively placed in pairs of brackets.

The particular MIDI status bytes are expressed by the bit strings equivalent to hexadecimal numbers [C0] to [CF] and [F0] to [FF], respectively. These MIDI status bytes have the most significant nibble expressed by hexadecimal number [F] or [C]. The most significant nibble [F] is changed to the bit string equivalent to [C], and, accordingly, the most significant nibble [C] is changed to the bit string equivalent to [C4]. The MIDI status bytes [F4] and [F5] are changed to the status data codes [C54] and [C55], respectively. Thus, the most significant nibble [F] is removed from the quasi MIDI status codes through the data conversion. This is because of the fact that the next data converter 113 requires the data nibble [F] for generating the data stream DS1 as will be described hereinlater in detail.

The reason why the most significant nibble [F] is replaced with the data nibble [C] is that only a small number of MIDI status bytes have the most significant nibble [F] and that the MIDI status bytes with the most significant nibble [F] represent system messages which are not frequently given in a performance. In order to discriminate the converted data nibble [C] from the data nibble [C] originally incorporated in other MIDI status bytes, the most significant nibble [C] of the MIDI status bytes is replaced with the data code equivalent to hexadecimal numbers [C4]. The MIDI status bytes with the most significant nibble [C] represent the program change, and the program change does not frequently occur. The MIDI status byte with the most significant nibble [C] is prolonged due to the data nibble [4] added thereto, and the data processing is a little bit delayed. However, the real time data processing is not required for the program change. A piece of music data information seldom follows the program change, and the delay is ignoreable. Moreover, the added data nibble [4] is so short that the quasi MIDI data words do not lower the transfer efficiency.

The MIDI status bytes [F4] and [F5] are further changed to the quasi MIDI status codes [C54] and [C55], respectively, because the MIDI status bytes [C0] to [CF] have been already changed to the quasi MIDI status data codes [C4x] (x=0, 1, 2, . . . F). As will be seen in the table shown in FIG. 5, the status bytes [F4] and [F5] are not defined in the MIDI standards. There is little possibility to transmit the MIDI data words qualified with the status bytes [F4] and [F5]. However, those status bytes [F4] and [F5] may be defined in future. Moreover, it is desirable to make the conversion table clear, and the added data nibble [5] is ignoreable in the data transmission. For this reason, the MIDI status bytes [F4] and [F5] are respectively changed to the quasi MIDI status codes [C54] and [C55].

While the electric keyboard 4 is transferring the MIDI music data words to the data converter 112 at irregular intervals, the data converter 112 checks each MIDI music data word to see whether or not the MIDI status byte is fallen into the prohibited range between [C0] and [CF] and between [F0] and [FF]. If the MIDI music data word has the MIDI status byte fallen within the prohibited range, the data converter 112 accesses the data conversion table 116, and reads out the corresponding quasi MIDI status data byte from the data conversion table 116 for replacing the prohibited MIDI status byte with the quasi MIDI status code read out from the data conversion table 116. Upon completion of the data conversion, the MIDI music data words are out of the definition of the MIDI standards. However, the MIDI message is still maintained therein. Thus, the MIDI data word is converted to the quasi MIDI data word through the data conversion. The data converter 12 supplies the quasi MIDI data word to the data converter 13.

On the other hand, the data conversion is not required for the status bytes out of the prohibited range. This means that the data converter 112 does not replace the MIDI status byte with any quasi MIDI status code. The data converter 12 transfers the MIDI data word to the data converter 13 without the data conversion. Nevertheless, the MIDI data words are also referred to as "quasi MIDI data word" between the data converter 112 and the data converter 323 in the description on the preferred embodiment.

The data converter 113 receives the quasi MIDI data words from the data converter 12, and forms the data stream DS1 for the synchronous data transmission. Since the quasi MIDI data words intermittently reach the data converter 113, the data converter 113 supplements the synchronous data nibble or nibbles each equivalent to hexadecimal number [F] among the quasi MIDI data words. As described hereinbefore, the hexadecimal number [F] has been already eliminated from the MIDI status bytes, and the synchronous data nibble [F] is never confused with the nibbles of the MIDI status bytes. The data stream DS1 is supplied to the signal modulation module 11.

Assuming now that a musician is playing a tune on the electric keyboard 4, the electric keyboard 4 produces MIDI data words representative of the performance in response to the finger work. The MIDI data words are asynchronously transferred from the electric keyboard 4 to the recording unit 2, and are a kind of asynchronous data.

Figure 6:
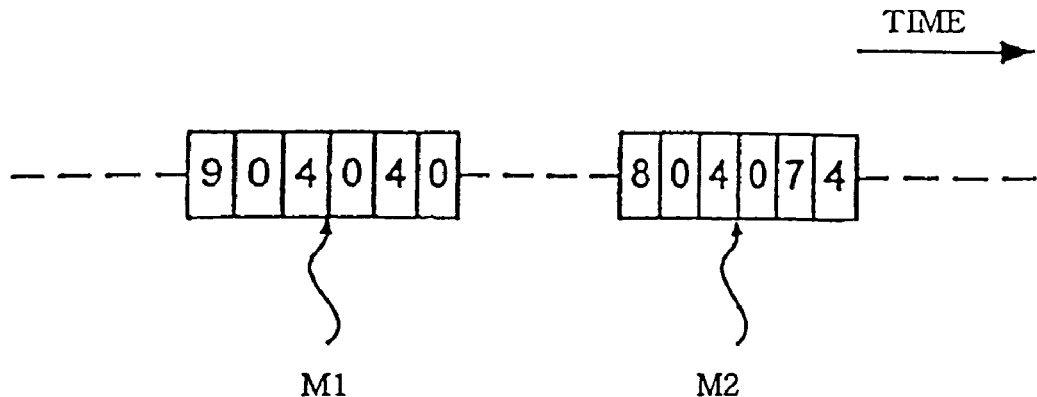
FIG. 6 is a view showing MIDI data words produced in a performance on an electric keyboard.
Figure 7:
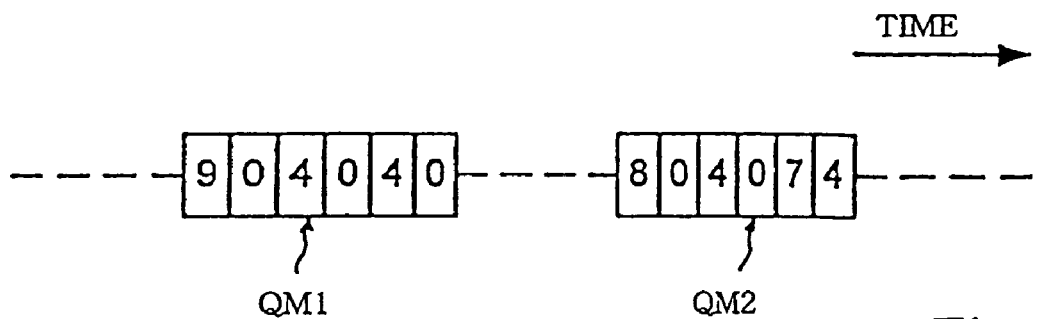
FIG. 7 is a view showing quasi MIDI data words produced from the MIDI data words through the data conversion.

FIG. 6 shows two of the MIDI music data words representative of the MIDI messages. Time runs as indicated by an arrow. The first MIDI music data word M1 is equivalent to hexadecimal number [904040], and the second MIDI music data word M2 is equivalent to hexadecimal number [804074]. The MIDI music data words M1 and M2 are spaced from each other and further from other MIDI music data words, and broken lines represents the irregular time intervals. The data converter 112 checks each MIDI music data word M1/M2 to see whether or not the MIDI status byte has the most significant nibble equal to hexadecimal numbers [F] or [C]. The most significant nibbles of the MIDI music data words M1 and M2 are [9] and [8], respectively, and the answer is given negative. The data converter 112 does not access the data conversion table 116, and transfers the MIDI music data words M1 and M2 to the next data converter 113 as the quasi MIDI music data words QM1 and QM2 (see FIG. 7). The quasi MIDI music data words QM1 and QM2 are also spaced from each other and further from the other quasi MIDI music data words as indicated by broken lines.

Figure 8:
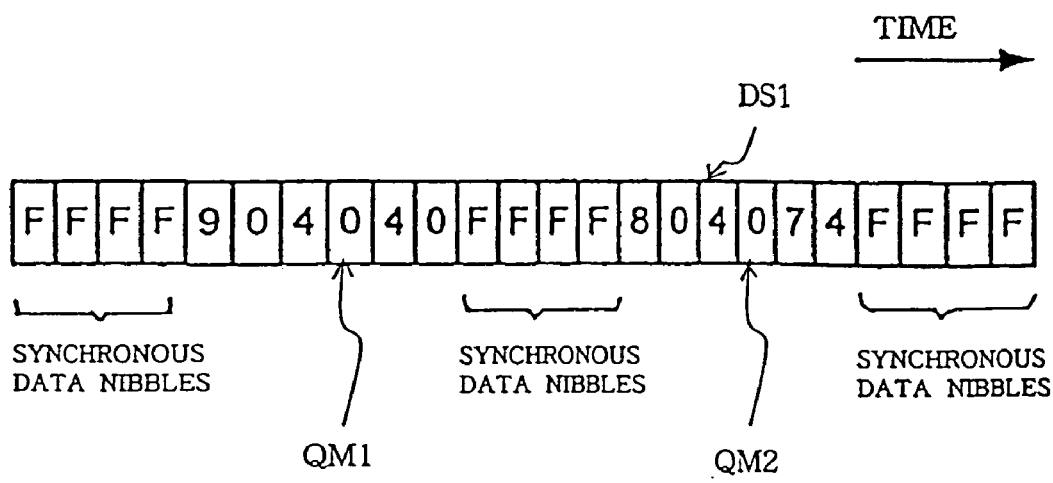
FIG. 8 is a view showing a data stream output from the data converting module.
Figure 9:
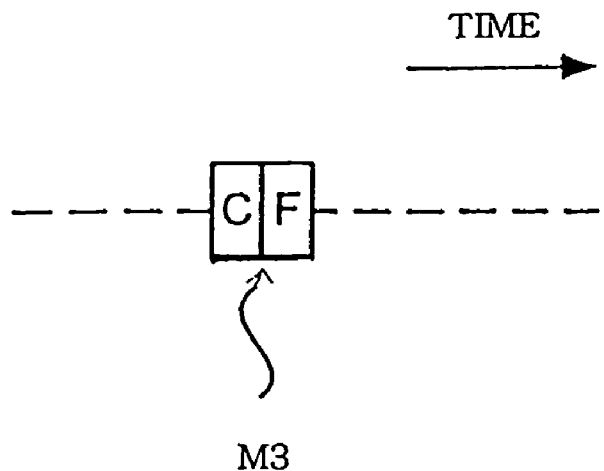
FIG. 9 is a view showing another MIDI data word produced in the performance on the electric keyboard.

The data converter 113 supplements the synchronous data nibbles [F] between the adjacent two quasi MIDI music data words, and converts the quasi MIDI music data words . . . , QM1, QM2, . . . to the data stream DS1 as shown in FIG. 8. The synchronous data nibbles [F] serve as the stuffing pulses in a justification technology, and the data stream DS1 is a kind of synchronous data.

Figure 10:
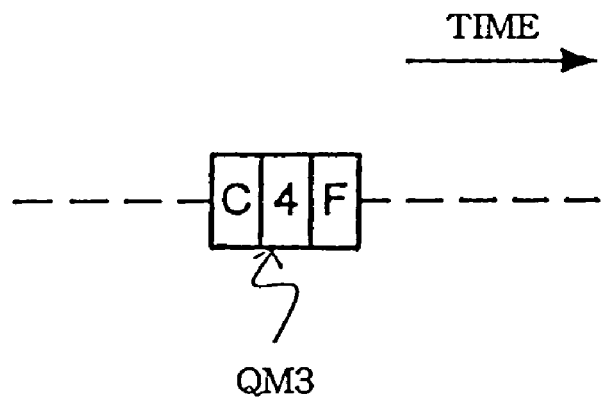
FIG. 10 is a view showing a quasi MIDI data word produced from the MIDI data word.
Figure 11:
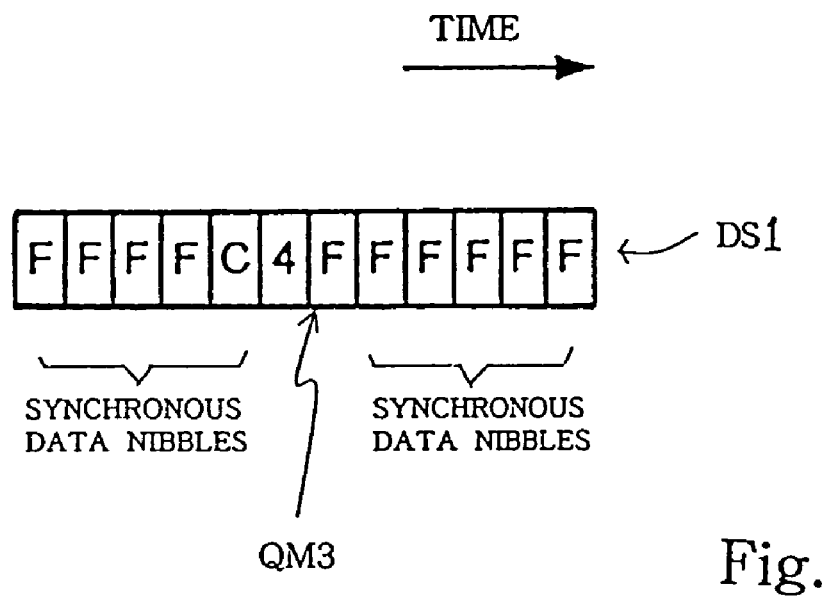
FIG. 11 is a view showing the quasi MIDI data word taken into the data stream.
Figure 12:
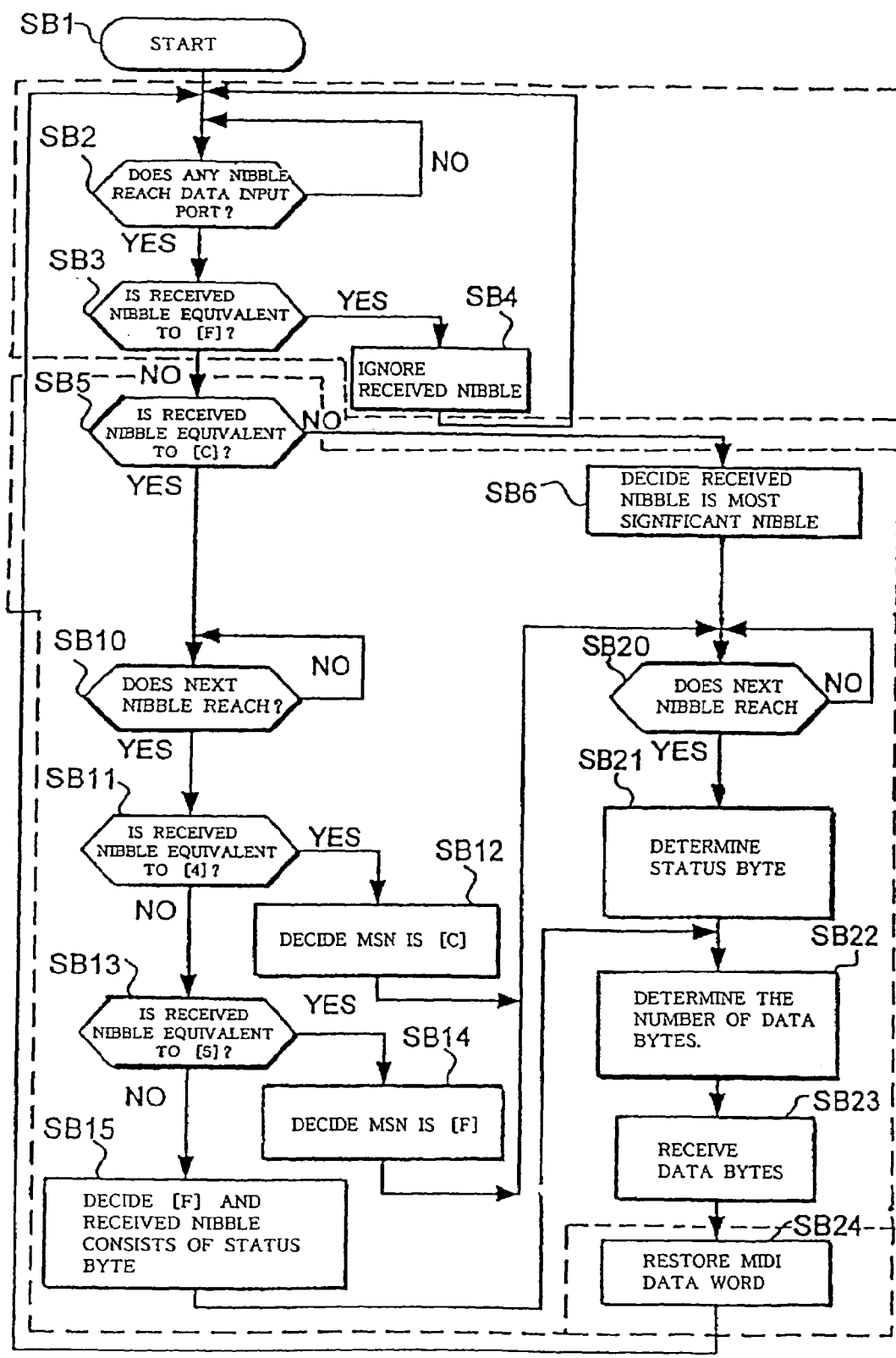
FIG. 12 is a flowchart showing a computer program executed by a data processor incorporated in the data converting module.

After the MIDI music data word M2, the electric keyboard 11 produces another MIDI music data word M3 (see FIG. 9), and supplies the MIDI music data word M3 to the data converter 112. The MIDI music data words M3 contains the status byte [CF] representative of the program change at channel F (see FIG. 5). The data converter 112 checks the MIDI music data word M3 to see whether or not the MIDI status byte is to be converted to a quasi MIDI status code. The MIDI status byte [CF] is fallen within the prohibit range, and the answer is given affirmative. Then, the data converter 112 accesses the data conversion table 116, and fetches the quasi MIDI status code [C4F] from the data conversion table 116. The data converter 112 replaces the MIDI status byte [CF] with the quasi MIDI status data code [C4F], and produces a quasi MIDI music data word QM3 as shown in FIG. 10. The data converter 112 supplies the quasi MIDI music data word QM3 to the data converter 113, and the data converter 113 supplements the synchronous data nibble [F] between the previous quasi MIDI music data word and the quasi MIDI music data word QM3 and between the quasi MIDI music data word QM3 and the next quasi MIDI music data word as shown in FIG. 11. Thus, the quasi MIDI music data word QM3 is taken into the data stream DS1.

When a user instructs the magneto-optical recorder 20 to reproduce the analog audio data signal AS2, the data read-out section 22 drives the DVD disk 7 for rotation, and the pieces of MIDI music data information are read out from the recording channel of the DVD disk 7 in the form of digital audio data signal. The digital audio data signal is converted to the analog audio data signal AS2, and is supplied to the signal demodulation module 31. The data stream DS2 is restored from the analog audio signal AS2 through the synchronous detection, and is supplied to the data converting module 32.

The data converter 323 sequentially fetches the programmed instructions from the program memory 324. The data processor 323 takes out the quasi MIDI music data words from the data stream DS2 through execution of the computer program shown in FIG. 12, and reproduces the MIDI music data words from the quasi MIDI music data words as described hereinbelow in detail.

Figure 13:
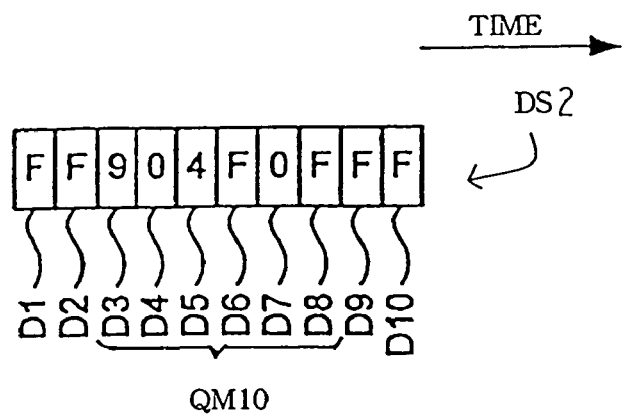
FIGS. 13 to 15 are views showing nibbles incorporated in a data stream.
Figure 14:
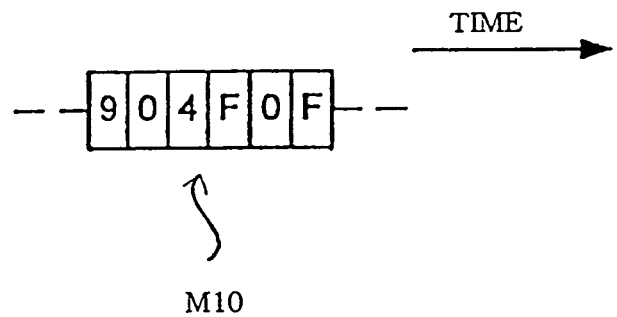
Figure 15:
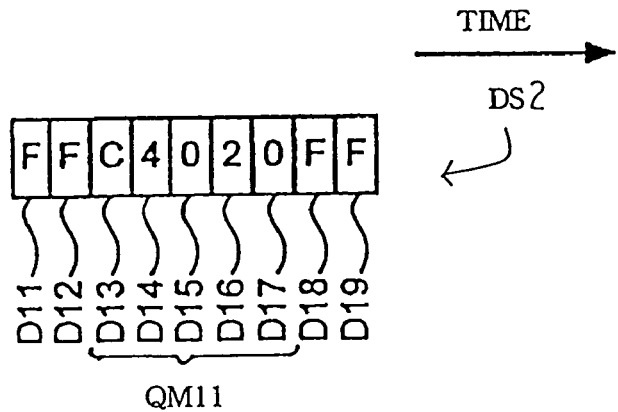
Figure 16:
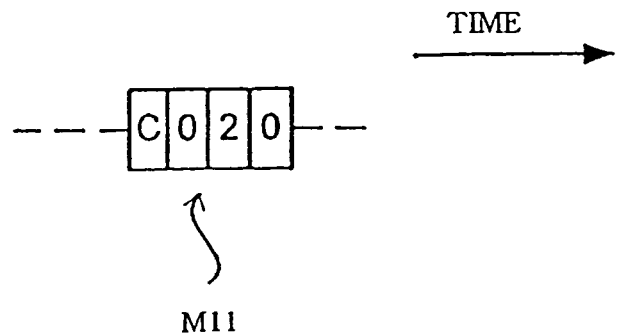
FIGS. 16 to 18 are views showing MIDI data words restored from the data stream.
Figure 17:
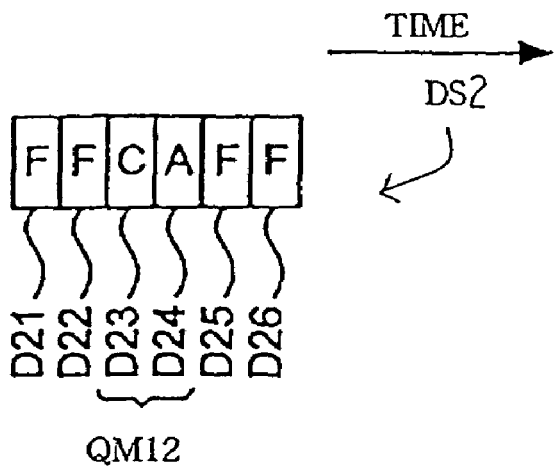
Figure 18:
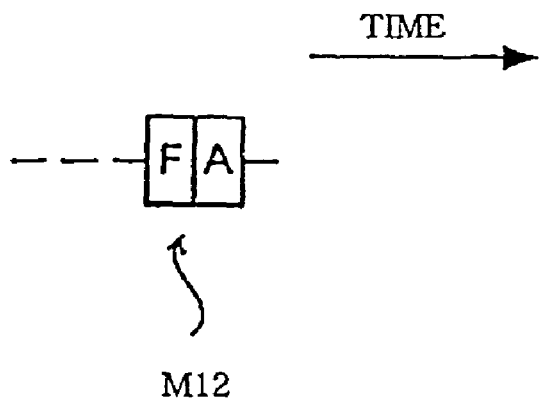

The data stream DS2 is assumed to contain a nibble string D1 to D10, D11 to D19 and D21 to D26 shown in FIG. 13. The data converter 323 starts the execution at step SB1. The nibble string D1 to D10 contains a quasi MIDI data word QM10 equivalent to hexadecimal number [904F0F] (see FIG. 14), and the other data nibbles D1, D2, D9 and D10 are the synchronous data nibbles [F]. The nibble string D11 to D19 contains another quasi MIDI data word QM11 equivalent to hexadecimal number [C4020] (see figure), and the nibble string D21 to D26 contains yet another quasi MIDI data word equivalent to hexadecimal number [CA] (see FIG. 17). Other data nibbles D11, D12, D18, D19, D21, D22, D25 and D26 are the synchronous data nibbles [F].

The data converter 323 checks the data input port thereof to see whether or not any data nibble reaches the data input port as by step SB2. Before the data read-out from the recording channel of the DVD disk 7, the data stream DS2 does not reach the data input port of the data converter 323, and the answer at step SB2 is given negative. The data converter 323 checks the data input port for the data stream DS2, again. Thus, the data converter 323 repeatedly executes the step SB2 until reception of the data stream DS2.

When the first data nibble D1 reaches the data input port, the answer at step SB2 is changed to the positive answer, and the data converter 323 proceeds to step SB3. The data converter 323 checks the received data nibble to see whether or not the received data nibble is the synchronous data nibble [F] at step SB3. The first data nibble D1 is equivalent to hexadecimal number [F], and serves as the synchronous data nibble. Then, the data converter 323 makes a decision that the received data nibble D1 is to be ignored as by step SB4, and returns to the step SB2. Thus, the data converter 323 eliminates the synchronous data nibble [F] from the data stream DS2 through the loop consisting of steps SB2, SB3 and SB4, and, accordingly, a data processing for eliminating the synchronous data nibble [F] is achieved through the loop consisting of steps SB2 to SB4.

Subsequently, the second data nibble D2 reaches the data converter 323, and the data converter 323 also decides to ignore the second data nibble D2 through the loop consisting of steps SB2, SB3 and SB4.

When the third data nibble D3 reaches the data converter 323, the answers at steps SB2 is given affirmative, but the answer at step SB3 is given negative. Then, the data converter 323 checks the received data nibble to see whether or not the received data nibble is equivalent to hexadecimal number [C] as by step SB5. The third data nibble is equivalent to hexadecimal number [9], and the answer at step SB5 is given negative. The data converter 323 decides that the third data nibble D3 is the most significant nibble of the received quasi MIDI data word QM10.

With the positive decision at step SB6, the data converter 323 proceeds to step SB20, and checks the data input port to see whether or not the next data nibble reaches there. While the next data nibble does not appear, the data converter 323 repeatedly checks the data input port for the next data nibble, and waits for it. When the next data nibble reaches the data input port, the answer at step SB20 is given affirmative, and the data converter 323 determines that the received data nibble and the previous data nibble form the MIDI status byte as by step SB21. In this instance, the fourth data nibble D4 is equivalent to hexadecimal number [0], and the data converter 323 determines the MIDI status byte is equivalent to hexadecimal number [90]. The data converter 323 determines that the first data nibble except [C] immediately after the synchronous data nibble [F] is the first data nibble of the MIDI status byte in the data stream DS2 through the data processing at steps SB5, SB6, SB20 and SB21.

The MIDI standards define the number of the MIDI data bytes to follow the MIDI status byte, and the data converter 323 has a list defining the relation between the MIDI status bytes and the associated MIDI data bytes. The data converter 323 checks the list for the MIDI status bytes [90], and finds that two MIDI data bytes are to follow as by step SB22. The data converter 323 receives the data nibbles D5, D6, D7 and D8 as by step SB23. Thus, the quasi MIDI data word QM10 has not been subjected to the data conversion, and the data converter 323 decides that the nibble string D3 to D8 [904F0F] represents the MIDI data word M10 (see FIG. 14) as by step SB24. Thus, the data converter 323 selects the MIDI data bytes from the data stream DS2 through the data processing at steps SB22, SB23 and SB24.

Upon completion of restoration of the MIDI data word [904F0F], the data converter 323 returns to step SB2, and eliminates the synchronous data nibbles [F] D9, D10, D11 and D12 from the data stream DS2 through the loop consisting of steps SB2 to SB4.

When the data nibble D13 reaches the data converter 323, the answer at step SB2 is given affirmative, and the answer at step SB3 is given negative. Then, the data converter 323 proceeds to step SB5, and checks the received data nibble to see whether or not it is equivalent to hexadecimal number [C]. The received data nibble D13 is equivalent to hexadecimal number [C] (see FIG. 15), and the answer at step SB5 is given affirmative. Then, the data converter 323 checks the data input port to see whether or not the next data nibble is received as by step SB10, and waits for it. When the next data nibble D13 reaches the data converter 323, the answer at step SB10 is given affirmative, and the data converter 323 checks the received data nibble to see whether or not it is equivalent to hexadecimal number [4] as by step SB11. The data nibble D13 is equivalent to hexadecimal number [4], and the answer at step SB11 is given affirmative. Then, the data converter 323 decides that the previous received data nibble [C] is the most significant nibble of the next MIDI status byte as by step SB12.

The data converter 323 waits for the next data nibble at step SB20. The next data nibble D15 is equivalent to hexadecimal number [0], and determines that the received data nibble [0] is the least significant nibble of the MIDI status byte. In other words, the data nibble [C] and the data nibble [0] form the MIDI status byte M11. Thus, the data converter 323 removes the data nibble [4] from the quasi MIDI status data code QM11, and restores the MIDI status byte [C0] (see the first row of the data conversion table 116 in FIG. 5). The data converter 323 checks the list for the MIDI data bytes associated with the MIDI status byte [C0] at step SB22. Only one data byte is to follow the MIDI status byte [C0], and receives the data nibbles D16 and D17 as the MIDI data byte at step SB23. The data converter 323 eliminates the data nibbles D11 to D19 from the data stream DS2, and restores the MIDI data word M11 equivalent to hexadecimal number [C020] (see FIG. 16) at step SB24.

Any MIDI status byte with the most significant nibble [5] is not presently defined in the MIDI standards. However, a data nibble equivalent to hexadecimal number [5] may reach the data processor 23 at the position presently occupied by the data nibble D14. In this case, the answer at step SB11 is given negative, and the data converter 323 proceeds to step SB13. The data converter 323 checks the received data nibble to see whether or not it is equivalent to hexadecimal number [5]. The answer at step SB13 is given affirmative, and the data converter 323 determines the most significant nibble is [F] (see the tenth row and the eleventh row in the data conversion table 116) as by step SB14, and waits for the next data nibble at step SB20. The next data nibble is either [4] or [5], and the data processor 23 determines that the received data nibble [4] or [5] is the least significant nibble of the MIDI status byte at step SB21. The data converter 323 checks the list for the number of data bytes at step SB22, and receives the data byte or bytes at step SB23.

The data converter 323 eliminates the synchronous data nibbles D18, D19, D21 and D22 through the loop consisting of steps SB2, SB3 and SB4. When the data nibble D23 reaches the data converter 323, the answer at step SB2 is given affirmative. The received data nibble D23 is equivalent to hexadecimal number [C], and the answer at step SB3 and the answer at step SB5 are given negative and affirmative, respectively. Then, the data converter 323 waits for the next data nibble D24 at step SB10. The data nibble D24 is equivalent to hexadecimal number [A], and the answers at steps SB11 and SB13 are given negative. Then, the data converter 323 proceeds to step SB15, and determines the data nibble [F] and the presently received data nibble D24 form the MIDI status byte as by step SB15 (see the sixteenth row of the data conversion table 16), and checks the list for the number of data bytes at step SB22. The status byte [FA] means the instruction "start", and any data byte does not follow the status byte. For this reason, the data converter 323 determines that the nibble string D21 to D26 contain the MIDI data word M12 equivalent to hexadecimal number [FA] (see FIG. 18) at step SB24.

The data converter 323 eliminates the synchronous data nibbles D25 and D26 through the loop consisting of steps SB2 to SB4, and waits for the next data nibble.

The MIDI data words M10, M11 and M12 are supplied to the tone generator 5 in a real time fashion, and tone generator 5 produces the audio signal from the MIDI data words. The audio signal is supplied to the sound system 6, and electronic tones are radiated from the sound system 6.

Thus, the data converter 323 determines the MIDI status byte through the data processing at steps SB5, SB6, SB10 to SB15, SB20 and SB21. For this reason, the data processing at these steps SB5, SB6, SB10 to SB15, SB20 and SB21 is referred to as "data processing for determining a status byte". As described hereinbefore, the data converter 23 determines the data bytes through the data processing at steps SB22 to SB24, and is referred to as "data processing for determining data bytes". The MIDI data word is restored through the data processing at steps SB5, SB6, SB10 to SB15 and SP20 to SB24. Thus, the data processing for restoring a MIDI data word is broken down into the data processing for determining a status byte and the data processing for determining data bytes.

Figure 19:
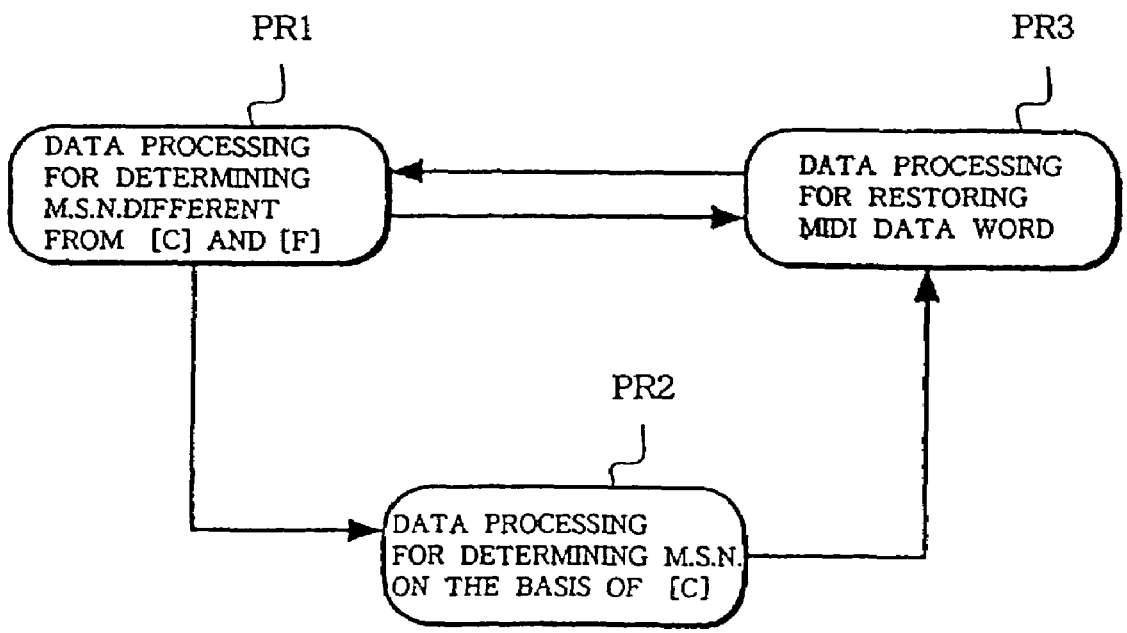
FIG. 19 is a view showing a concept of a method for producing the data stream from another aspect.

The most significant nibbles [C] and [F] are converted to the data codes [C4], [C] and [C5] before the recording. The method shown in FIG. 12 may be broken down into a data processing PR1 for determining the most significant nibble different from the data nibbles [C] and [F], a data processing PR2 for determining the most significant nibble on the basis of the data nibble [C] and a data processing PR3 for restoring a MIDI data word as shown in FIG. 19. The data processing PR1 is carried out at steps SB2, SB3, SB4, SB5 and SB6, and the data processing PR2 is carried out at steps SB10 to SB15. The data processing RP3 is carried out at steps SB20 to SB24. When the most significant nibble is determined through the data processing PR1, the data converter 323 directly proceeds to the data processing PR3, and returns from the data processing PR3 to the data processing PR1. However, if the most significant nibble is not determined through the data processing PR1, the data converter 323 determines the most significant nibble through the data processing PR2, and, thereafter, proceeds to the data processing PR3.

As will be appreciated from the foregoing description, the synchronous data nibbles are supplemented into the irregular intervals between the MIDI data words, and the synchronous data nibbles are eliminated from the continuous data stream. Neither start bit nor stop bit is required for any of the MIDI data words. For this reason, the MIDI messages are transferred at high transfer efficiency.

Signal Modulation and Demodulation

The data converting module 10 supplies the data stream DS1 to the signal modulation module 11, and the data stream 11 is subjected to the 16 differential phase-shit keying for producing the analog audio data signal AS1. Description is hereinbelow made on the modulation from the data stream DS1 to the analog audio data signal AS1.

The MIDI music data words and the synchronous nibble form the data stream DS1, and the unit data length is the nibble. The signal modulation module 11 successively changes the data nibbles of the data stream DS1 to corresponding gray codes, and repeatedly adds a phase equivalent to the gray code of the present data nibble to the phase equivalent to the previous gray code for producing a modulating signal representative of the phase of the present data nibble. In other words, the signal modulation module 11 accumulates the values of the phase for producing the modulating signal. The reason for the accumulation is that, even if the synchronous nibbles [F] are continued, the playback unit 3 achieves the synchronization through the rotation of the phase. Thus, the signal modulation module 11 produces the modulating signal representative of the phase of the present data nibble. Subsequently, the signal modulation module 11 modules the carrier signal with the modulating signal, and produces the analog audio data signal AS1.

Figure 21:
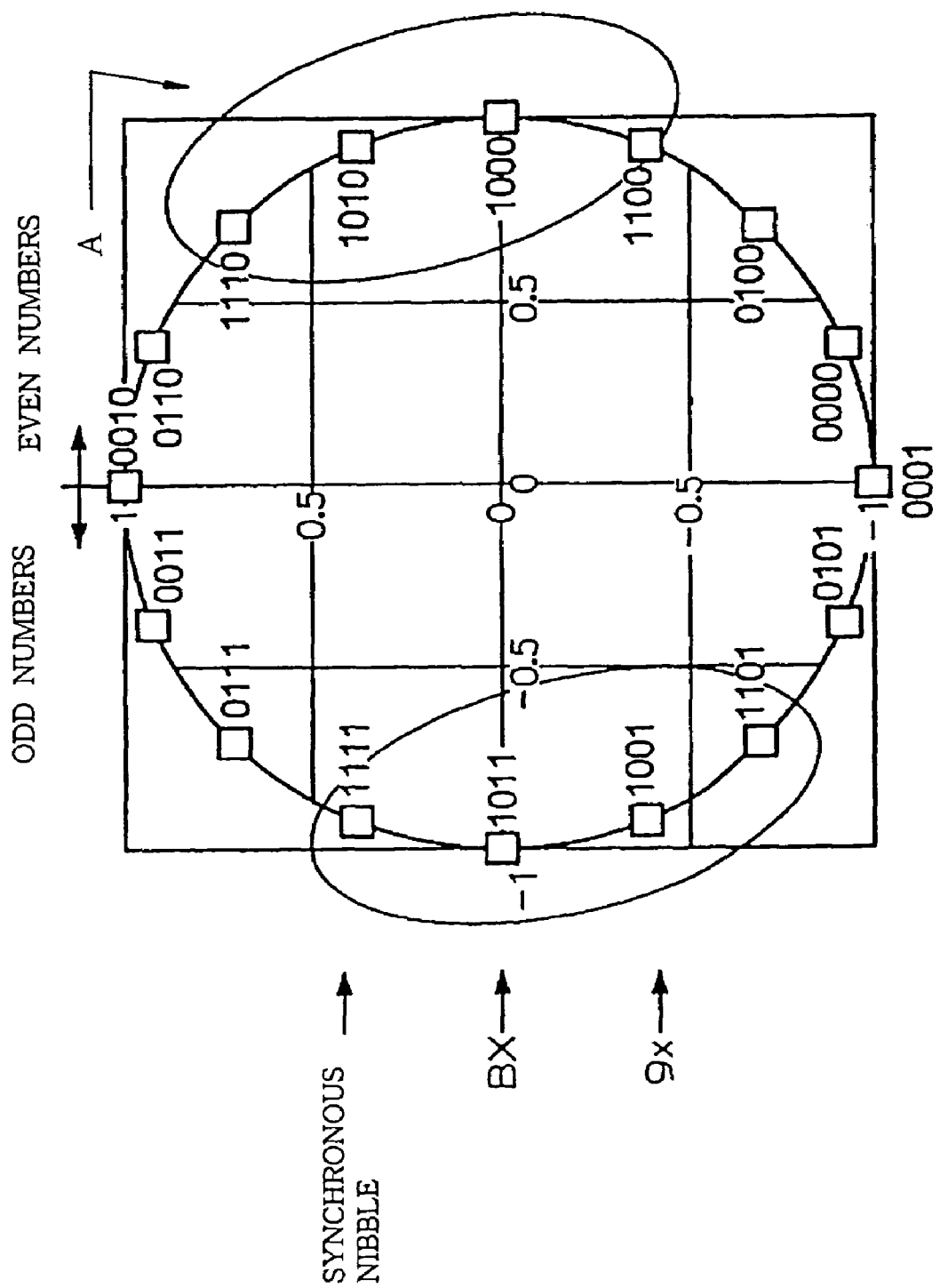
FIG. 21 is a graph showing a spacious arrangement of the gray codes.

FIG. 20 shows the relation among the 4-bit gray codes, the relative phase or the phase differences and I and Q components of Q-I coordinate system. FIG. 21 shows the relation between I-component and Q-component in the Q-I coordinate system. The second column from the left side in FIG. 20 is assigned to the position on the circle shown in FIG. 21. In the Q-I coordinate system, 157.5 degrees is assigned to the gray code (1111) equivalent to the hexadecimal number [F], and the gray codes are arranged in the counter clockwise direction. Since the gray code [F] is positioned at 157.5 degrees, it is guaranteed that the phase is stepwise varied during the reception of the synchronous nibbles [F]. This means that the synchronization is surely achieved in the playback unit 3. In case where the MIDI status byte are alternated with the MIDI data byte or bytes, it is appropriate to make the relative phase between the gray codes as large as possible. The MIDI status byte is usually alternated with the MIDI status data byte or bytes. For this reason, the gray codes greater than [8] and the gray codes less than [8] are appropriately assigned in the vicinity of 0/180 degrees and in the vicinity of 90/270 degrees in the Q-I coordinate system. The relative phase of zero is assigned to the gray code [8]. The phase is surely varied in so far as the gray code is not changed as [8]-[8]-[8]-[8]-[8]. These patterns are seldom in the data stream DS1 containing the MIDI music data words. For this reason, any scramble is not required.

In detail, the MIDI status byte and the MIDI data byte or bytes alternately appear in the data stream DS1. The MIDI status byte has the first nibble, the bit 3 of which is value 1. On the other hand, the MIDI data byte or a series of bytes has the first nibble, the bit 3 of which is value 0. When the MIDI music data words are separated into nibbles, it is guaranteed that the most significant bits or bits 3 do not continuously take value 1. In the spacious arrangement for the modulating signal shown in FIGS. 20 and 21, the nibbles with bits 3 of 1 are gathered in the vicinity of relative phase 0 so as not to continue around zero degree (see zone A in FIG. 21). If the data are continued to be around zero degrees, it is difficult to detect the boundary between the nibbles. This results that the demodulated signal is liable to be out of the synchronization. The demodulated signal is less liable to be out of the synchronization by virtue of the spacious arrangement for the modulating signal. The silent signal (1111) of the data stream DS1 has the most significant nibble corresponding to the gray code (1011), and the MIDI message representative of the control change [Bxxxxx] where x is indefiniteness also has the most significant nibble corresponding to the gray code (1011). The MIDI status byte representative of the note-on [90xxxx] is frequently generated in a performance, and has the most significant nibble corresponding to the gray code (1001). In this situation, these gray codes are located in the vicinity of 180 degrees (see zone B) so as to make the detection of the change in the data stream DS1.

Circuit Configuration of Signal Modulation Module

The signal modulation module 11 and the signal demodulation module 31 are hereinbelow described in detail with reference to FIG. 22.

Figure 22:
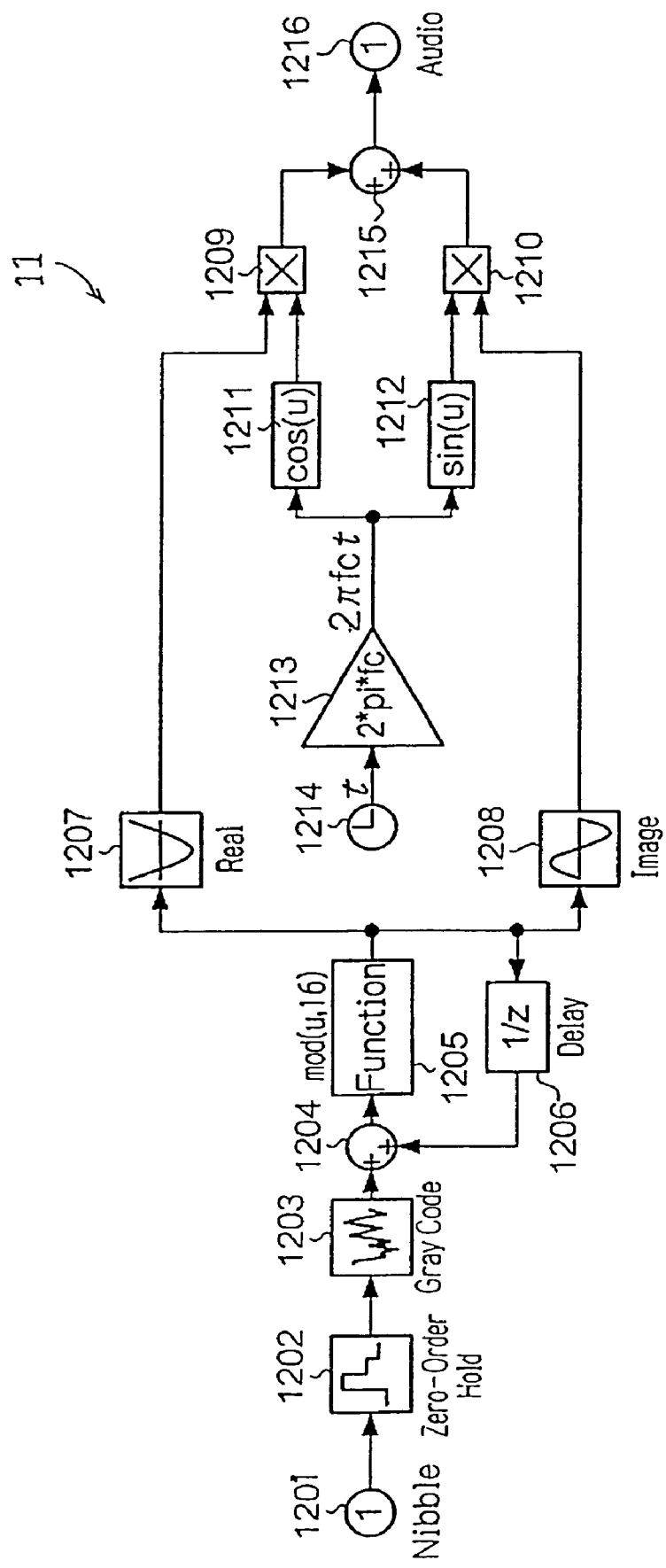
FIG. 22 is a block diagram showing the circuit configuration of a signal modulation module incorporated in the recording unit.
Figure 23:
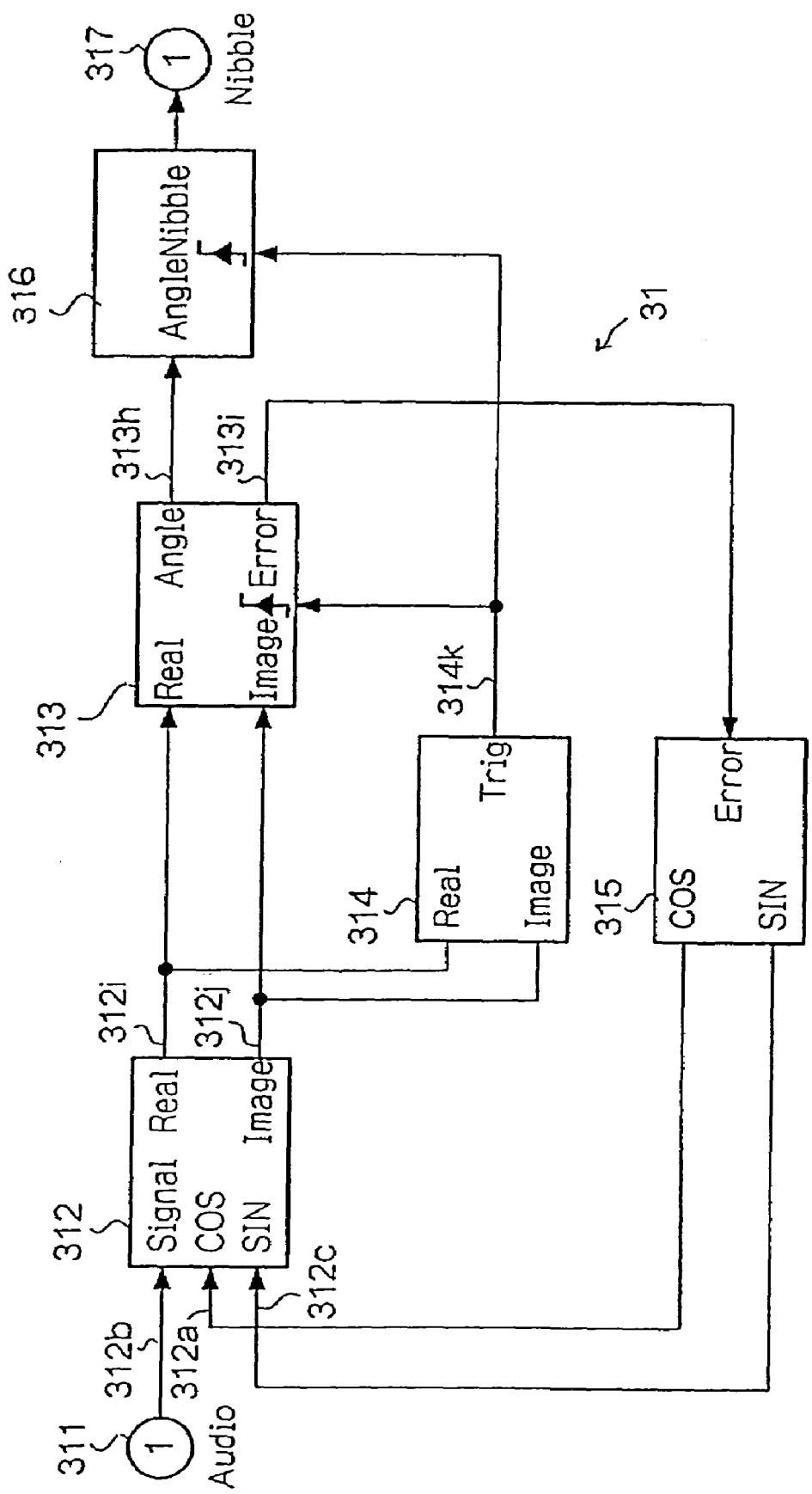
FIG. 23 is a block diagram showing the circuit configuration of a signal demodulation module incorporated in the playback unit.

FIG. 22 shows the circuit configuration of the signal modulation module 11. The signal modulation module 11 includes a zero-order hold circuit 1202 and a gray code generator 1203. The zero-order hold circuit 1202 is connected to an input port 1201 of the signal modulation module 11, and the nibbles of the data stream DS1 are successively supplied from the input port 1201 to the zero-order hold circuit 1202. The zero-order hold circuit 1202 latches a data nibble, and maintains the data nibble until the next data nibble reaches. While the zero-order hold circuit 1202 holds a data nibble, the data nibble is supplied to the gray code generator 1203. The gray code generator 1203 converts the data nibble to the 4-bit gray code corresponding thereto. The 4-bit gray code is representative of the relative phase.

The signal modulation module 11 further includes an adder 1204, a modulo function unit 1205 and a delay circuit 1206. The gray code generator 1203 is connected to the first input port of the adder 1204, and the output port of the adder 1204 is connected to the modulo function unit 1205. The output port of the modulo function unit 1205 is connected through the delay circuit 1206 to the second input port of the adder 1204. Thus, the adder 1204, the modulo function unit 1205 and the delay circuit 1206 form an accumulation loop for producing a 4-bit data code representative of an absolute phase from the 4-bit gray codes. In detail, the modulo function unit 1205 divides the sum by sixteen, and outputs a 4-bit data code representative of the remainder. The remainder is representative of the absolute phase. The delay circuit 1206 introduce a time delay into the propagation of the 4-bit data code representative of the remainder from the modulo function unit 1205 to the second input port of the adder 1204. The next gray code reaches the first input port of the adder 1204, and the remainder is added to the value of the next gray code. Thus, the values of the relative phase or the phase differences are accumulated through the accumulation loop 1204, 1205 and 1206, and the 4-bit data code representative of the absolute phase is output from the modulo function unit 1205. The zero-order hold circuit 1202 and the gray code generator 1203 as a whole constitute a code converter for converting the binary code to the gray code. The accumulation loop 1204, 1205 and 1206 serves as a digital code-to-absolute phase converter.

The signal modulation module 11 further includes a real axis converter 1207 and an imaginary axis converter 1208 and multipliers 1209 and 1210. The 4-bit data code representative of the absolute phase is supplied to the real axis converter 1207 and the imaginary axis converter 1208. The real axis converter 1207 calculates an in-phase component, and outputs a data code representative of the in-phase component. On the other hand, the imaginary axis converter 1208 calculates a quadrature-phase component, and outputs a data code representative of the quadrature-phase component. The data codes are supplied from the real axis converter 1207 and the imaginary axis converter 1208 to the multipliers 1209 and 1210, respectively.

The signal modulation module 11 further includes a cosine wave component generator 1211, a sine wave component generator 1212, a multiplier 1213, a clock circuit 1214 and an adder 1215. The clock circuit 1214 generates a time signal representative of the elapsed time t from the sampling timing. In other words, the elapsed time is reset at time intervals each equal to the sampling period. The time signal is supplied from the clock circuit 1214 to the multiplier 1213. A reference signal is representative of $2\pi fc$ where fc is the frequency of the carrier signal, and is supplied from a signal source (not shown) to the multiplier 1213. The multiplier 1213 multiplies the value of the reference signal $2\pi$ fc by the elapsed time t, and generates a reference phase signal $2\pi fct$. The reference phase signal $2\pi fct$ is supplied from the cosine wave component generator 1211 and the sine wave component generator 1212. The cosine wave component generator 1211 generates a cosine wave component signal representative of the cosine wave component of the carrier signal with unit amplitude, and the sine wave component generator 1212 generates a sine wave component signal representative of the sine wave component of the carrier signal with unit amplitude. The cosine wave component signal is supplied from the cosine wave component generator 1211 to the multiplier 1209, and the in-phase component is multiplied by the cosine wave component in the multiplier 1209. On the other hand, the sine wave component signal is supplied from the sine wave component generator 1212 to the multiplier 1210, and the quadrature-phase component is multiplied by the sine wave component. The multiplier 1209 outputs a product signal, and the product signal is supplied to the first input port of the adder 1215. On the other hand, the multiplier 1210 outputs a product signal, which is supplied to the second input port of the adder 1215. The product signals are added to each other in the adder 1215, and the analog audio data signal AS1 is supplied from the adder 1215 to an output port 1216 of the signal modulation module 11. The real axis converter 1207, the imaginary axis converter 1208, the multipliers 1209, 1210, the cosine wave component generator 1211, the sine wave component generator 1212, the clock circuit 1214, the multiplier 1213 and the adder 1215 as a whole constitute a quadrature modulation circuit. Thus, the signal modulation module 11 is broken down into the code converter 1202/1203, the digital code-to-absolute phase converter 1204/1205/1206 and the quadrature modulation circuit 1207/1208/1209/1210/ 1211/1212/1213/1214/1215.

Circuit Configuration of Signal Demodulation Module

The circuit configuration of the signal demodulation module 31 is described with reference to FIGS. 23 to 28. The signal demodulation circuit 31 includes a synchronous detector 312, a coordinate transformation circuit 313, a trigger signal generator 314, a phase-locked loop 315 and a reverse mapping circuit 316. The analog audio data signal AS2 is supplied from an input port 311 to a signal input terminal 312*b* of the synchronous detector 312. The phase locked loop 315 supplies a cosine wave component signal representative of the cosine wave component of an oscillation signal and a sine wave component signal representative of the sine wave component of the oscillation signal to signal input terminals 312*a* and 312*c*, respectively. The cosine wave component and the sine wave component are representative of a waveform corresponding to the carrier signal, and the phase locked loop 315 controls the frequency of the oscillation signal so as to match the phase of the waveform with the phase of the carrier signal. The synchronous detector 312 extracts a series of momentary points from the analog audio data signal AS2, and determines a real part of each momentary point and an imaginary part of the momentary point. The synchronous detector 312 outputs an output signal representative of the real part and another output signal representative of the imaginary part from signal output terminals 312*i* and 312*j*, respectively. The real part and the imaginary part are indicative of the momentary point of the analog audio data signal AS2 in the quadrature coordinate system, and, accordingly, are the coordinates in the quadrature coordinate system. The output signal representative of the real part and the output signal representative of the imaginary part are supplied from the signal output terminals 312*i* and 312*j* to both of the coordinate transformation circuit 313 and the trigger signal generator 314.

The trigger signal generator 314 is responsive to the output signals of the synchronous detector 312 for generating a trigger signal indicative of a synchronous timing. The trigger signal is supplied from the signal output terminal 314*k* to the coordinate transformation circuit 313. The coordinate transformation circuit 313 is responsive to the trigger signal for convert the coordinates in the quadrature coordinate system to corresponding coordinates in a polar coordinate system. One of the coordinates is indicative of the angle between zero to $2\pi$ in the polar coordinate system. The coordinate transformation circuit 313 produces an output signal representative of the angle, and supplies the output signal from the signal output terminal 313*h* to the reverse mapping circuit 316. The angle of the momentary point may be different from one of the sixteen angular positions (see FIG. 21). The coordinate transformation circuit 313 further determines an error component introduced in the angle through a frequency multiplication technique, and produces another output signal representative of the error component. The coordinate transformation circuit 313 supplies the output signal representative of the error component from another signal output terminal 313*i* to a control terminal of the phase locked loop 315. The phase locked loop 315 is responsive to the output signal representative of the error component so as to correct the phase of the waveform.

The reverse mapping circuit 316 is responsive to the trigger signal so as to convert the approximate angle to a 4-bit data nibble corresponding to the 4-bit gray code at the approximate angle. Thus, the signal demodulation module 12 restores the carrier signal on the basis of the analog audio data signal AS2, and reproduces the series of data nibbles also from the analog audio data signal AS2 through the coordinate transformation from the quadrature coordinate system to the polar coordinate system and through the data conversion from the approximate angle to the data nibble. In this instance, the signal demodulation module 31 is broken down into a carrier restoring circuit 312/313/315, a data converter 312/313/314 for converting the quadrature data to the angular data and another data converter 316 for converting the angular data to the data nibble.

Figure 24:
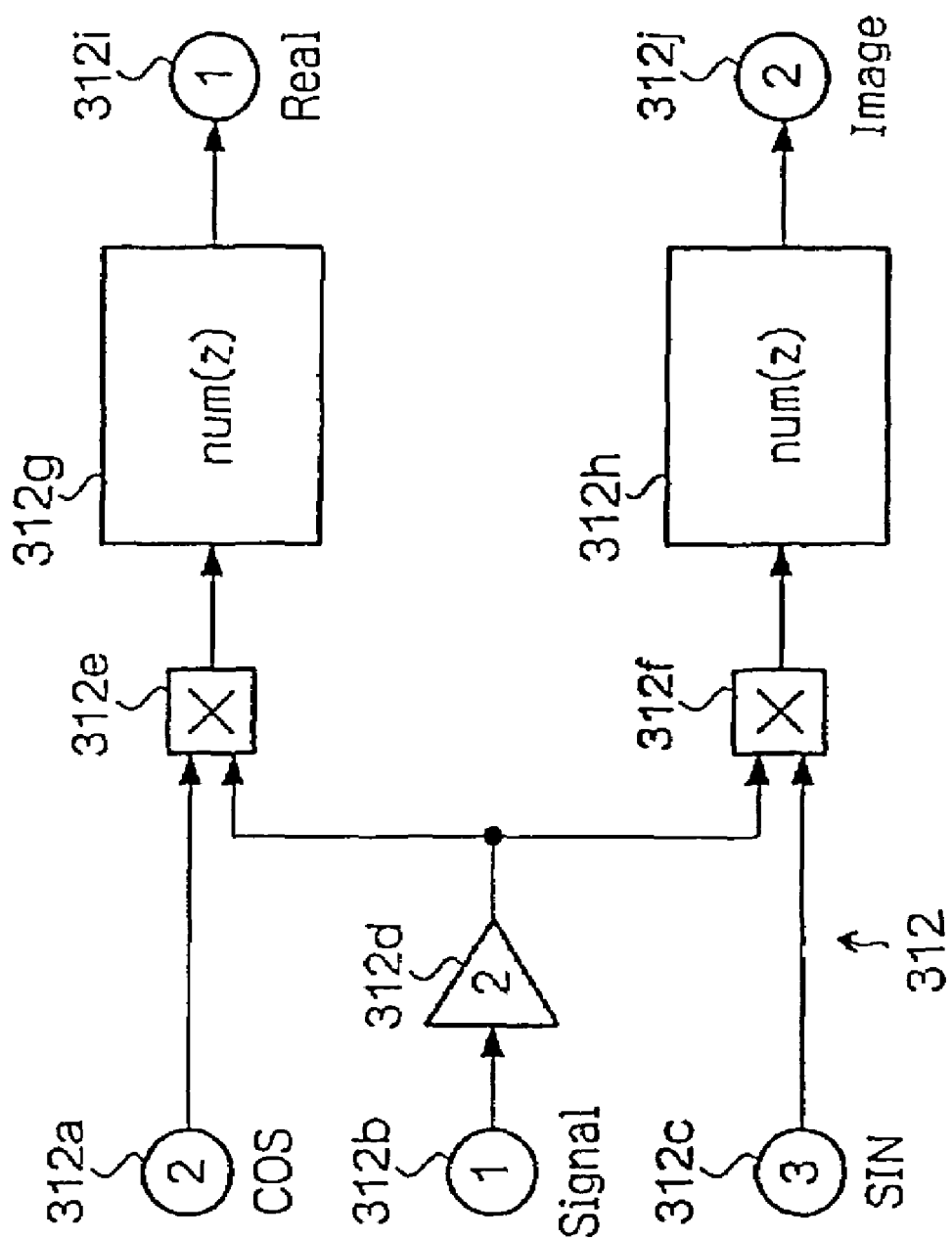
FIG. 24 is a block diagram showing the circuit configuration of a synchronous detector incorporated in the signal demodulation circuit.

FIG. 24 shows the circuit configuration of the synchronous detector 312. The synchronous detector 312 has the three signal input terminals 312a/312b/312c and the two signal output terminals 312i/312j, and an amplifier 312d, multipliers 312e/312f and cosine roll-off filters 312g/312h are connected between the signal input terminals 312a/312b/312c and the signal output terminals 312i/312j. The analog audio data signal AS2 is supplied from the signal input terminal 312b through the amplifier 312d to both of the multipliers 312e/312f. The cosine wave component signal is supplied from the signal input terminal 312a to the multiplier 312e, and the multiplier 312e carries out the multiplication between the value of the analog audio data signal AS2 and the value of the cosine wave component signal for producing an output signal representative of the product. On the other hand, the sine wave component signal is supplied form the signal input terminal 12c to the multiplier 12f, and the multiplier 312f carries out the multiplication between the value of the analog audio data signal AS2 and the value of the sine wave component signal for producing an output signal representative of the product.

The output signal is supplied from the multiplier 312e to the cosine roll-off filter 312g, and the other output signal is supplied from the multiplier 312f to the other cosine roll-off filter 312h. The cosine roll-off filters 312g/312h have the roll-off ratio α of 1.0. The cosine roll-off filters 312g/12h restrict the frequency of the base band, and extracts the real part and the imaginary part. The cosine roll-off filters 312g/312h produces the output signal representative of the real part and the output signal representative of the imaginary part, and supplies the output signals to the signal output terminals 312i/312j, respectively.

Figure 25:
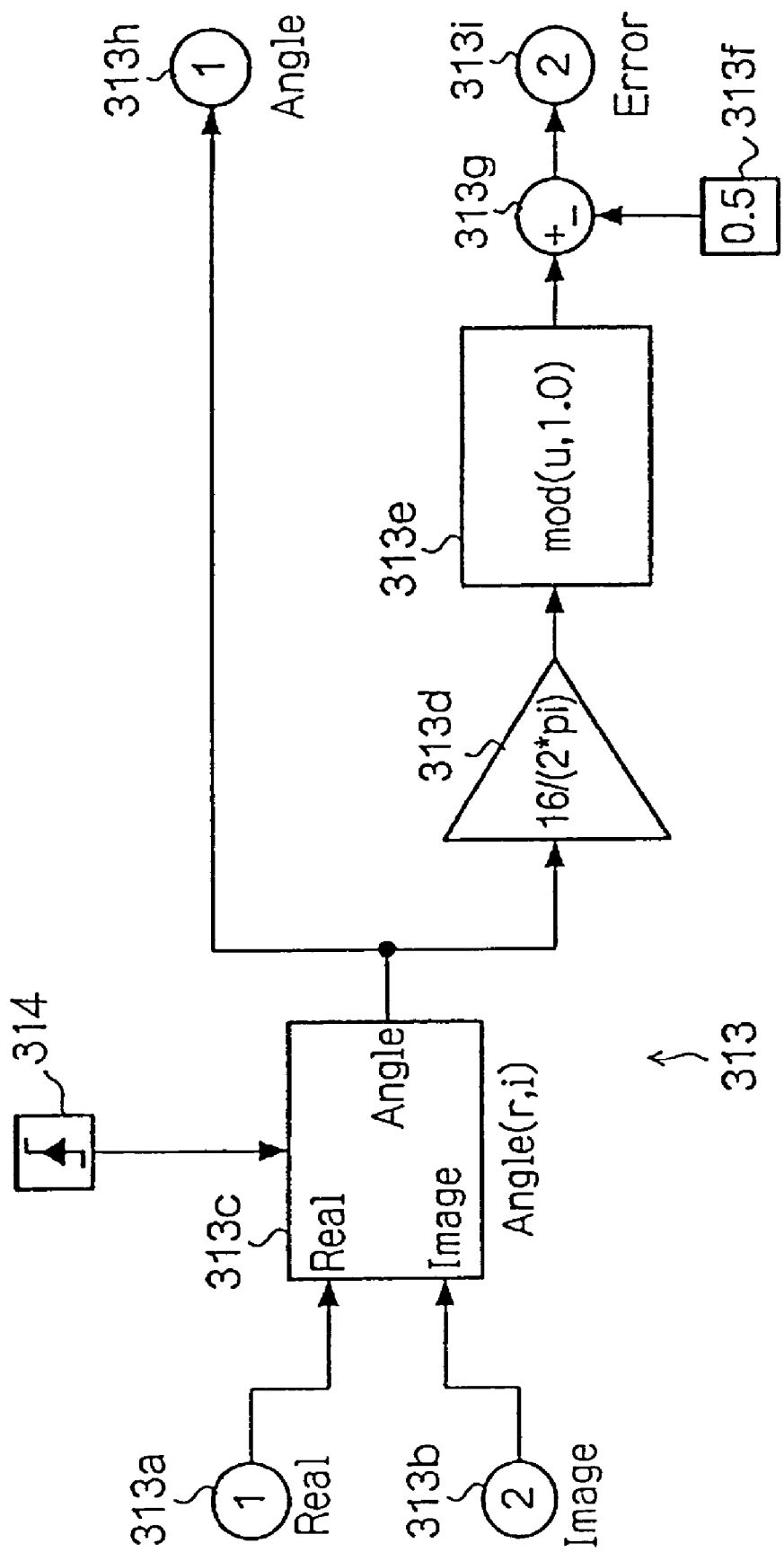
FIG. 25 is a block diagram showing the circuit configuration of a coordinate transformation circuit incorporated in the signal demodulation circuit.

FIG. 25 shows the circuit configuration of the coordinate transformation circuit 313. The coordinate transformation circuit 313 has the signal input terminals 313a/313b respectively assigned to the output signals of the synchronous detector 312 and the signal output terminals 313h/313i assigned to the output signal representative of the angle and the output signal representative of the error component. A coordinate transformer 313c, a multiplication/division circuit 313d, a modulo function circuit 313e, a source 313f of constant and an addition/subtraction circuit 313g are connected between the signal input terminals 313a/313b and the signal output terminals 313h/313i.

The real part and the imaginary part are the coordinates assigned to a point in the quadrature coordinate system, and the coordinate transformer 313c is responsive to the trigger signal so as to convert the coordinates in the quadrature coordinate system to the corresponding coordinates in the polar coordinate system. One of the coordinates in the polar coordinate system is representative of the angle of the momentary point, and the coordinate transformer 313c supplies the output signal representative of the angle to the signal output terminal 313h.

The output signal representative of the angle is further supplied to the multiplication/division circuit 313d, and the angle is multiplied by 16/2π. The product ranges from zero to sixteen. The multiplication/division circuit 313d produces an output signal representative of the product, and supplies the output signal to the modulo function circuit 313e. The product usually consists of an integer and a decimal. The modulo function circuit 313e produces an output signal representative of the decimal, and supplies the output signal to the addition/subtraction circuit 313g. The source of constant 313f supplies an output signal representative of 0.5 to the addition/subtraction circuit 313g, and 0.5 is subtracted from the decimal. The addition/subtraction circuit 313g produces an output signal representative of the difference, and supplies the output signal to the signal output terminal 313i. Thus, the phase is multiplied by sixteen, and the piece of symbol information is degenerated through the modulo function unit 313e for extracting the error. This data processing is known as the frequency multiplication technique.

Figure 26:
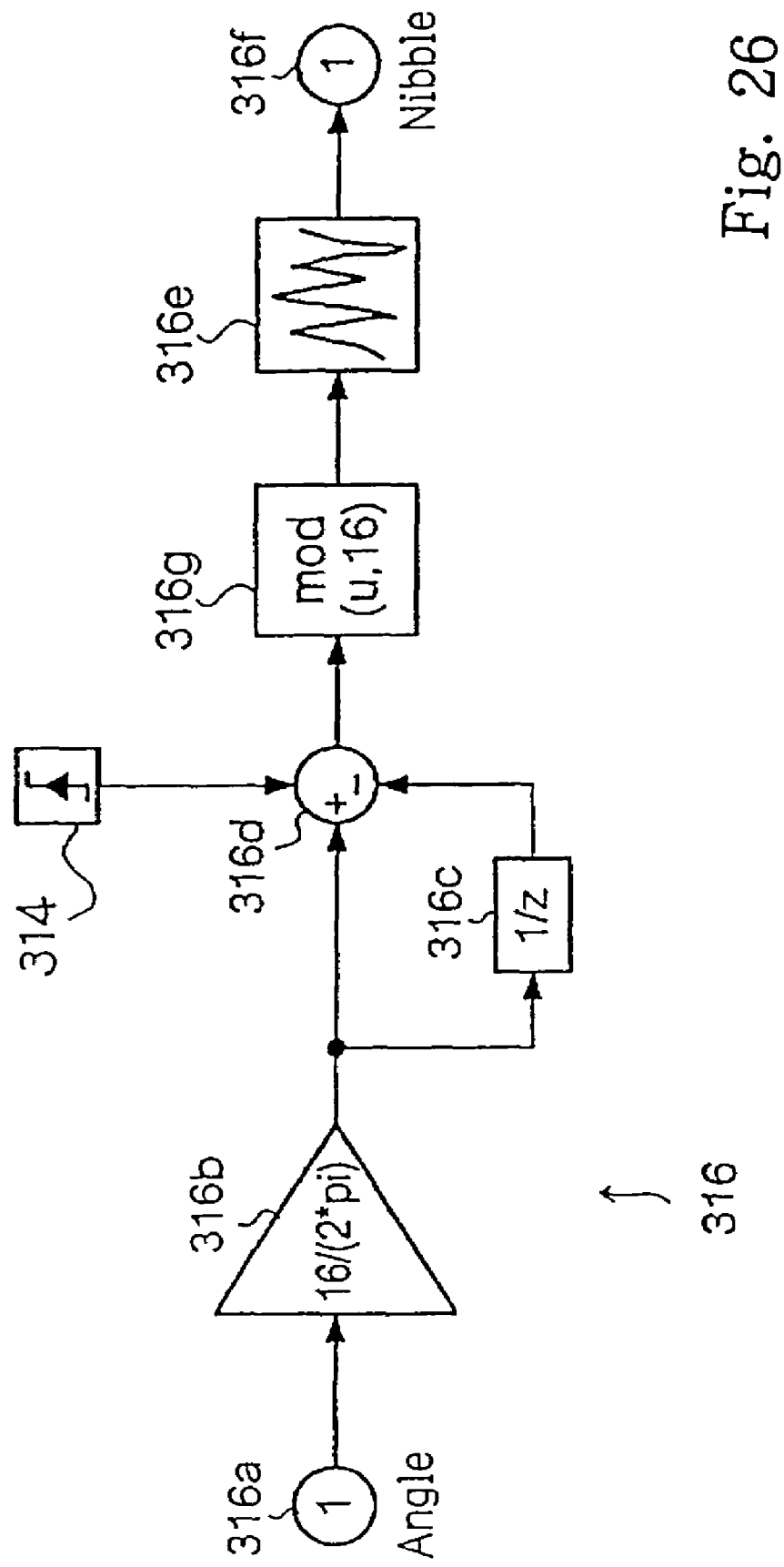
FIG. 26 is a block diagram showing the circuit configuration of a reverse mapping circuit incorporated in the signal demodulation circuit.

FIG. 26 shows the reverse mapping circuit 316. The reverse mapping circuit 316 has the signal input terminal 316a and the signal output terminal 316f, and a multiplication/division circuit 316b, a delay circuit 316c, an addition/subtraction circuit 316d, a modulo function circuit 316g and a data converter 316e are connected between the signal input terminal 316a and the signal output terminal 316f. The output signal representative of the angle is supplied from the signal input terminal 316a to the multiplication/division circuit 316b, and the angle is multiplied by 16/2π. The angle ranges from zero to 2π, and the product ranges from zero to sixteen. The multiplication/division circuit 316b produces an output signal representative of the product, and supplies the output signal to the delay circuit 316 and the addition/subtraction circuit 316d. The delay circuit 316c introduces a time delay into the propagation of the output signal, and the product is subtracted from the next product. This means the data conversion from the absolute phase to the relative phase. The addition/subtraction circuit 316d produces an output signal representative of the difference between the product and the next product, i.e., the relative phase, and supplies the output signal to the modulo function circuit 316g. The difference is divided by sixteen, and the modulo function circuit 316g produces an output signal representative of the remainder obtained through the division. The output signal is supplied from the modulo function circuit 316g to the data conversion circuit 316e. The gate conversion circuit 316e carries out the reverse data conversion from the gray code to the corresponding data nibble, and supplies the data nibble to the signal output terminal 316f. Thus, the signal demodulation circuit 31 restores the data stream DS2 on the basis of the analog audio data signal AS2.

Figure 27:
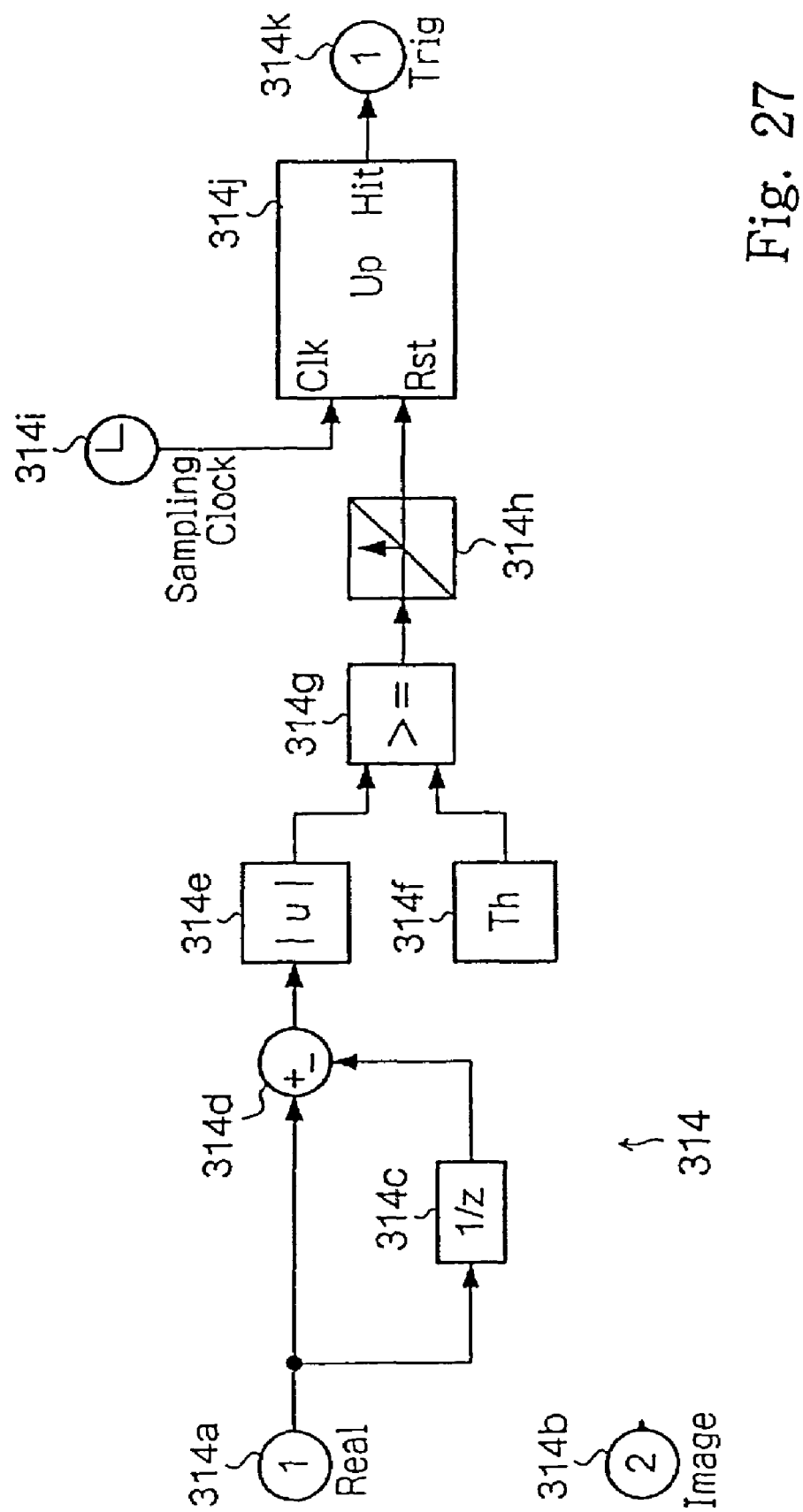
FIG. 27 is a block diagram showing the circuit configuration of a trigger signal generator incorporated in the signal demodulation circuit.

FIG. 27 shows the circuit configuration of the trigger signal generator 314. The output signals representative of the real part and the imaginary part are supplied to the signal input terminals 314a and 314b, respectively. The trigger signal generator 314 further includes a delay circuit 314c, an addition/subtraction circuit 314d, an absolutizing circuit 314e, a threshold generator 314f, a comparator 314g, an edge detector 314h, a clock generator 314i and a counter 314j.

The output signal representative of the real part is supplied to the delay circuit 314c and the addition/subtraction circuit 314d. The delay circuit 314c introduces a time delay into the propagation of the real part, and supplies the real part to the addition/subtraction circuit 314e. The real part and the next real part reach the addition/subtraction circuit 314d, and the value of the real part is subtracted from the value of the next real part. The addition/subtraction circuit 314d produces an output signal representative of the difference, and supplies the output signal to the absolutizing circuit 314e. The absolutizing circuit 314e determines the absolute value of the difference, and produces an output signal representative of the absolute value. The output signal representative of the absolute value is supplied from the absolutizing circuit 314e to the comparator 314g. The threshold generator 314f supplies an output-signal representative of a threshold to the comparator 314g, and the comparator 314g compares the absolute value with the threshold to see whether the absolute value exceeds the threshold. When the absolute value exceeds the threshold, the comparator 314g raises an output signal at the output node thereof. The output signal is supplied form the comparator 314g to the edge detector 314h. The edge detector 314h monitors the output signal of the comparator 314g to see whether or not the comparator 314g raises the output signal. When the edge detector 314h detects the leading edge of the output signal, the edge detector 314h changes a reset signal to active level, and supplies the reset signal to the reset node of the counter 314j. The clock generator 314i generates a clock signal equal in frequency to the sampling clock signal, and supplies the clock signal to the clock node of the counter 314j. In this instance, the sampling clock signal is 44100 kHz, and, accordingly, the clock signal is 44100 kHz. After the counter 314j is reset with the reset signal, the counter 314j increments the count stored therein. When the count reaches a predetermined value, the counter 314j changes the trigger signal to the active level, and the trigger signal is supplied to the coordinate transforming circuit 313 and the reverse mapping circuit 316.

Figure 28:
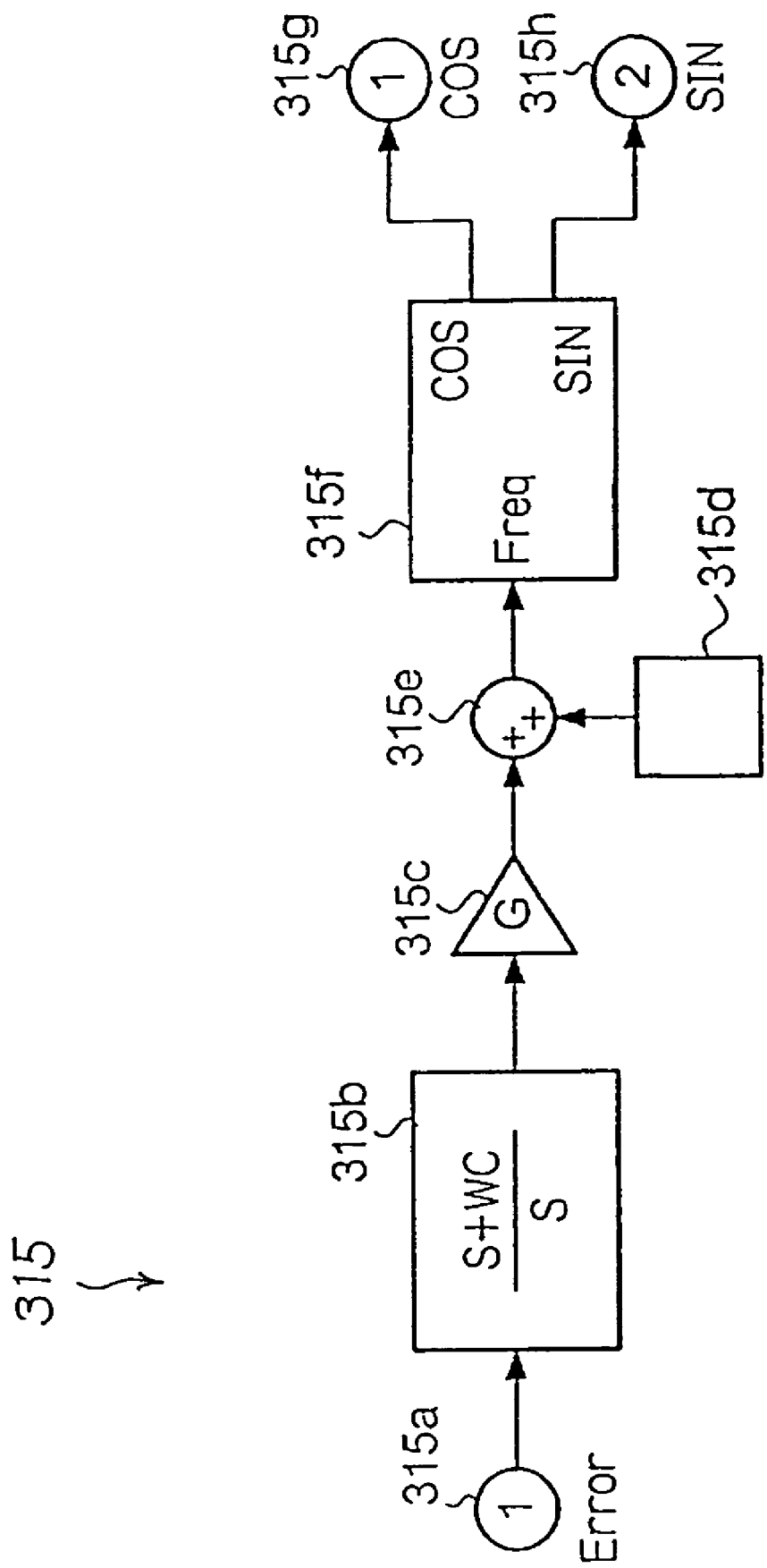
FIG. 28 is a block diagram showing the circuit configuration of a phase-locked loop incorporated in the signal demodulation circuit.

FIG. 28 shows the circuit configuration of the phase-locked loop 315. The phase locked loop 315 includes a loop filter 315b, a loop gain amplifier 315c, a source of constant 315d, an adder 315e and a voltage-controlled oscillator 315f. The source of constant 315d produces an output signal representative of a value corresponding to the carrier frequency of 6300 Hz. The output pulse signal representative of the error component is supplied from the signal input terminal 315a to the loop filter 315b. The loop filter 315 is implemented by a low boost filter, which has a predetermined cut-off angular frequency $\omega c$. The output pulse signal is filtered by the loop filter 315b. The frequency components equal to or greater than the predetermined angular frequency $\omega$are output at gain equal to 1, and the frequency components less than the predetermined angular frequency $\omega$are output at gain greater than 1. The output signal of the loop filter 315b is amplified by the loop gain amplifier 315c, and the value of the output signal is added to the contact value corresponding to the carrier frequency of 6300 Hz by the adder 315e. The adder 315e produces an output signal representative of the sum, and supplies the output signal to the control node of the voltage-controlled oscillator 315f. The voltage-controlled oscillator 315f is responsive to the potential level at the control node, and produces the oscillation signal at a frequency corresponding to the potential at the control node. The cosine wave component and the sine wave component are extracted from the oscillation signal, and produce the output signal representative of the cosine wave component and the output signal representative of the sine wave component. The voltage-controlled oscillator 315f supplies the output signals to the synchronous detector 312.

As will be understood from the foregoing description, the MIDI messages are stored in the analog audio data signal AS1 through the differential phase shift keying, and the MIDI messages are retrieved from the analog audio data signal AS2 through the synchronous detection and the data converting techniques. Even though the MIDI messages are asynchronously produced in the form of digital code, various kinds of recorder are available for the analog audio data signals AS1/AS2.

In order to store the asynchronously produced MIDI messages in the analog audio data signal AS1, the synchronous data nibbles are inserted into the time intervals among the MIDI music data words representative of the MIDI messages for producing the data stream DS1, and the data stream DS1 is subjected to the differential phase shift keying. The differential phase shift keying is broken down into the data conversion and the quadrature modulation. In detail, the data stream DS1 is firstly converted to a series of data codes representative of the relative phase of the data nibbles through the gray code data conversion, and the series of data codes representative of the relative phase of the data nibbles are further converted to a series of data codes representative of the absolute phase through the data accumulation. It is desirable to employ the first data conversion, i.e., the gray code data conversion, because the first data conversion permits the synchronous data nibbles to change the relative phase in the series of data codes. Finally, the analog audio data signal AS1 is produced from the series of data codes representative of the absolute phase through the quadrature modulation.

In order to retrieve the MIDI messages from the analog audio data signal AS2, the analog audio data signal AS2 is subjected to the synchronous detection for producing the data stream DS2, and the synchronous data nibbles are eliminated from the data stream DS2 so as to leave the asynchronously produced MIDI music data words representative of the MIDI messages. The synchronous detection is broken down into the carrier signal restoration, the signal conversion from the analog audio data signal AS2 to the data signal representative of the coordinates in the quadrature coordinate system, the data conversion from the coordinates in the quadrature coordinate system to the coordinates in the polar coordinate system and the reverse mapping to the data nibbles. Thus, the data stream DS2 is restored from the analog audio data signal AS2, and the asynchronously produced MIDI music data words are extracted from the data stream DS2.

Second Embodiment

Figure 29:
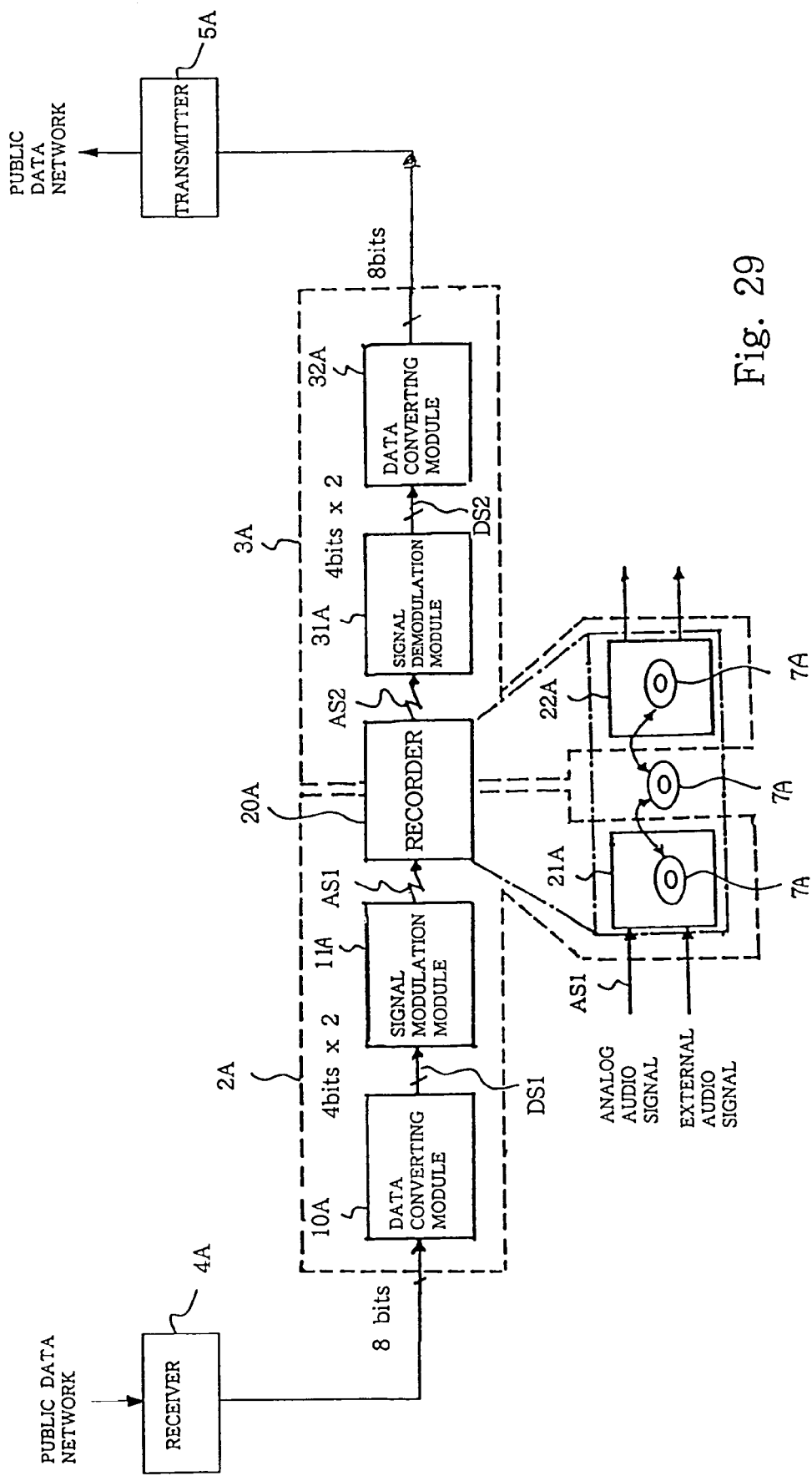
FIG. 29 is a block diagram showing the circuit configuration of another recording and reproducing system according to the present invention.

Turning to FIG. 29 of the drawings, another recording and reproducing system embodying the present invention is designated at its entirety by reference numeral 1A. The recording and reproducing system 1A is broken down into a recording unit 2A and a playback unit 3A. A receiver 4A is connected to the recording unit 2A, and the MIDI music data words are transferred from a public data network through the receiver 4A to the recording unit 2A. The MIDI music data words may be transferred from an internet server, a musical instrument or a suitable recording medium through the public network. The recording unit 2A converts the MIDI music data words to a series of digital data codes, and stores the series of digital data codes in a CD-R (Compact Disk Recordable) disk or a DVD-R (Digital Versatile Disk Recordable) disk. The CD-R disk and the DVD-R disk are hereinbelow simply referred to as "information storage disk", and the information storage disk is labeled with reference 7A in FIG. 29. The playback unit 3A reads out the series of digital data codes from the information storage disk 7A, and restores the MIDI music data words from the series of digital data codes. The playback unit 3A is connected to a transmitter 5A, and the MIDI messages are transferred through the transmitter 5A to the public data network. FIG. 30 shows the specification of the recording and reproducing system 1A. Comparing FIG. 30 with FIG. 2, it is understood that the specification of the recording and reproducing system 1A is substantially identical with that of the recording and reproducing system 1. Differences are the recording channel in case where the compact disk is employed. The digital audio data signal is stored in the right channel R, and the left channel L is assigned to the external audio signal. Taking the start/stop bits of the MIDI music data words into account, the bit rate of 25.2 kbps is higher than the bit rate of 31.25 kbps defined in the MIDI standards.

The recording unit 2A includes a data converting module 10A, a signal modulation module 11A and a data write-in section 21A of a recorder 20A. On the other hand, the playback unit 3A includes a data read-out section 22A, a signal demodulation module 31A and a data converting module 32A. The data write-in section 21A and the data read-out section 22A are integrated in the recorder 20, and the recorder 20 is obtainable in the market.

Figure 31:
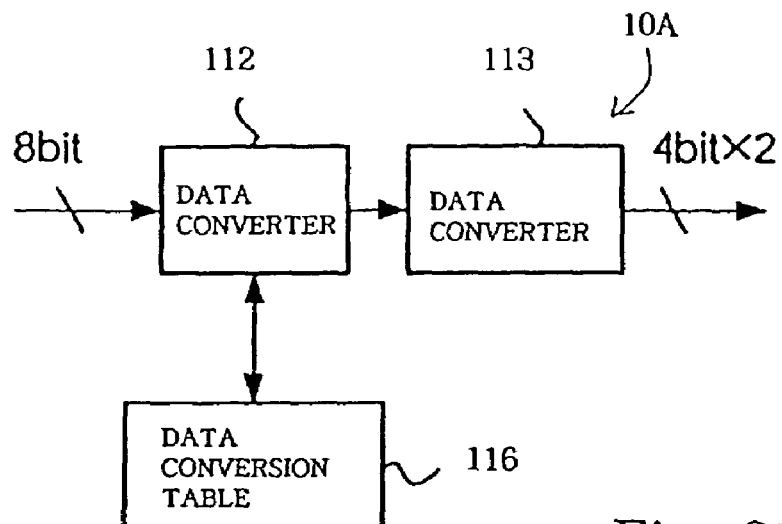
FIG. 31 is a block diagram showing the function of a data converting module incorporated in a recording unit of the recording and reproducing system.
Figure 32:
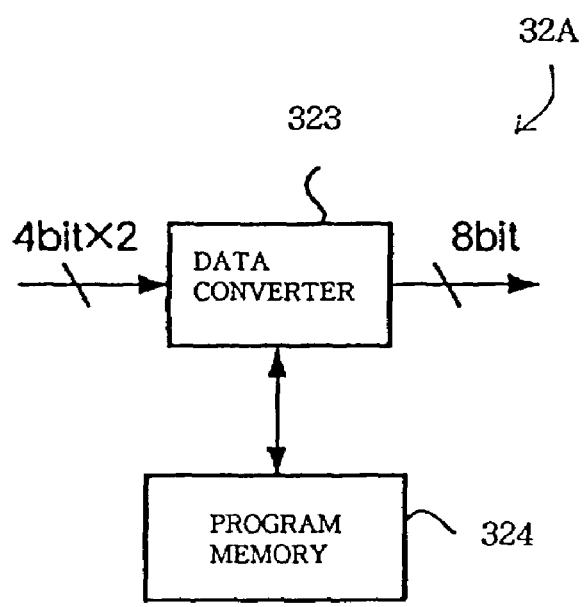
FIG. 32 is a block diagram showing the function of a data converting module incorporated in a playback unit of the recording and reproducing system.

The data converting module 10A includes the data converters 112 and 113 and the data conversion table 116 as similar to the data converting module 10 (see FIG. 31), and, accordingly, similarly behaves. When the MIDI music data words such as M1, M2 and M3 (see FIGS. 6 and 9) are supplied to the data converter 112, the data converter 112 produces the quasi MIDI music data words such as QM1, QM2 and QM3 (see FIGS. 7 and 10), and the data converter 113 supplements the synchronous nibbles [F] into the intervals among the quasi MIDI music data words (see FIGS. 8 and 11).

Figure 33:
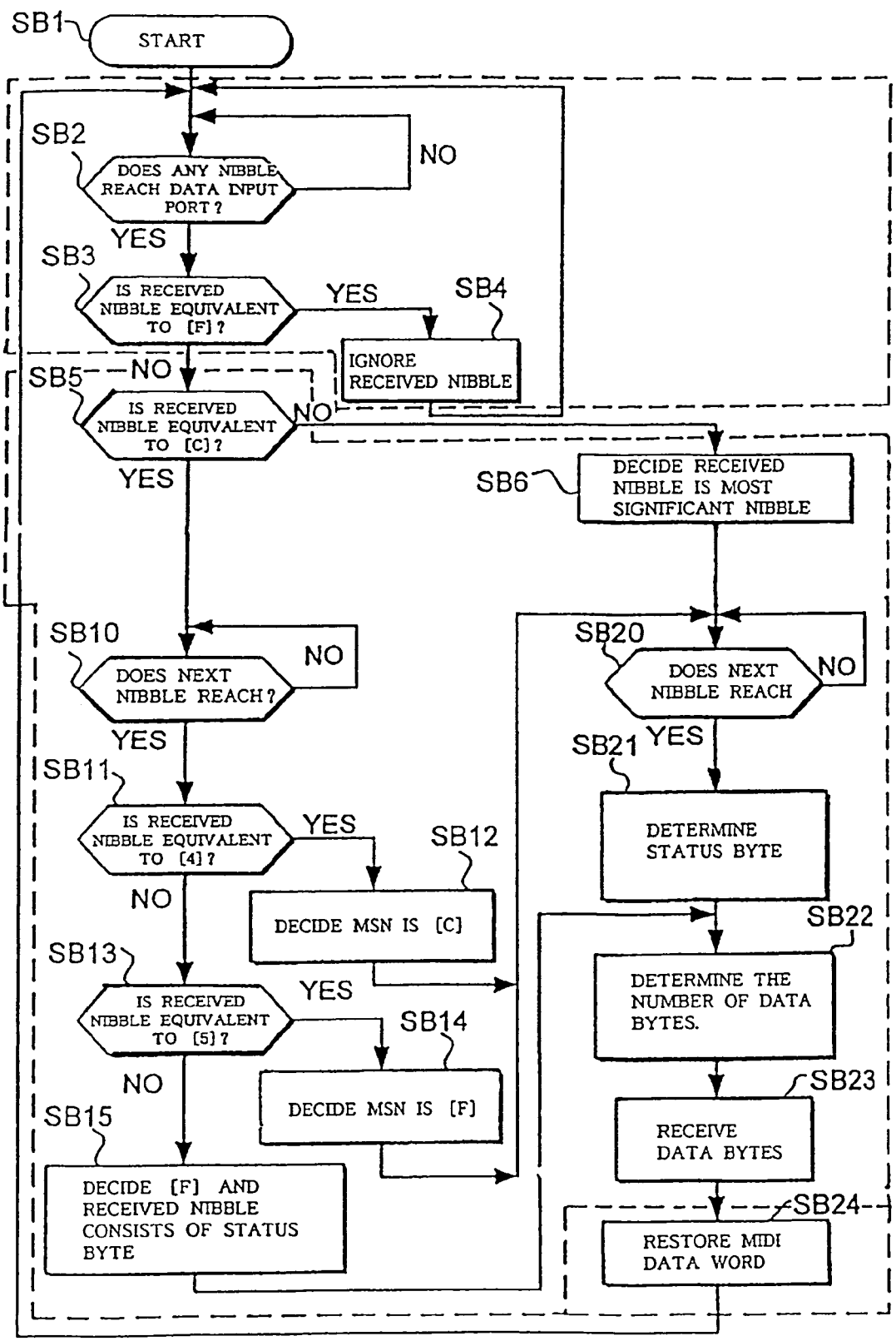
FIG. 33 is a flowchart showing a computer program executed by the data converting module.

The data converting module 32A includes the data converter 323 and the program memory 324 as similar to the data converting module 32, and the program memory 324 stores the computer program shown in FIG. 33. The computer program shown in FIG. 33 is identical with that shown in FIG. 12. When the data stream DS2 is supplied to the data converter 323 (see FIGS. 13, 15 and 17), the data converter 323 restores the MIDI music data words M10, M11 and M12 from the data stream DS2 (see FIGS. 14, 16 and 18) through the execution of the computer program. For this reason, no further description is hereinbelow incorporated for the sake of simplicity.

Figure 34:
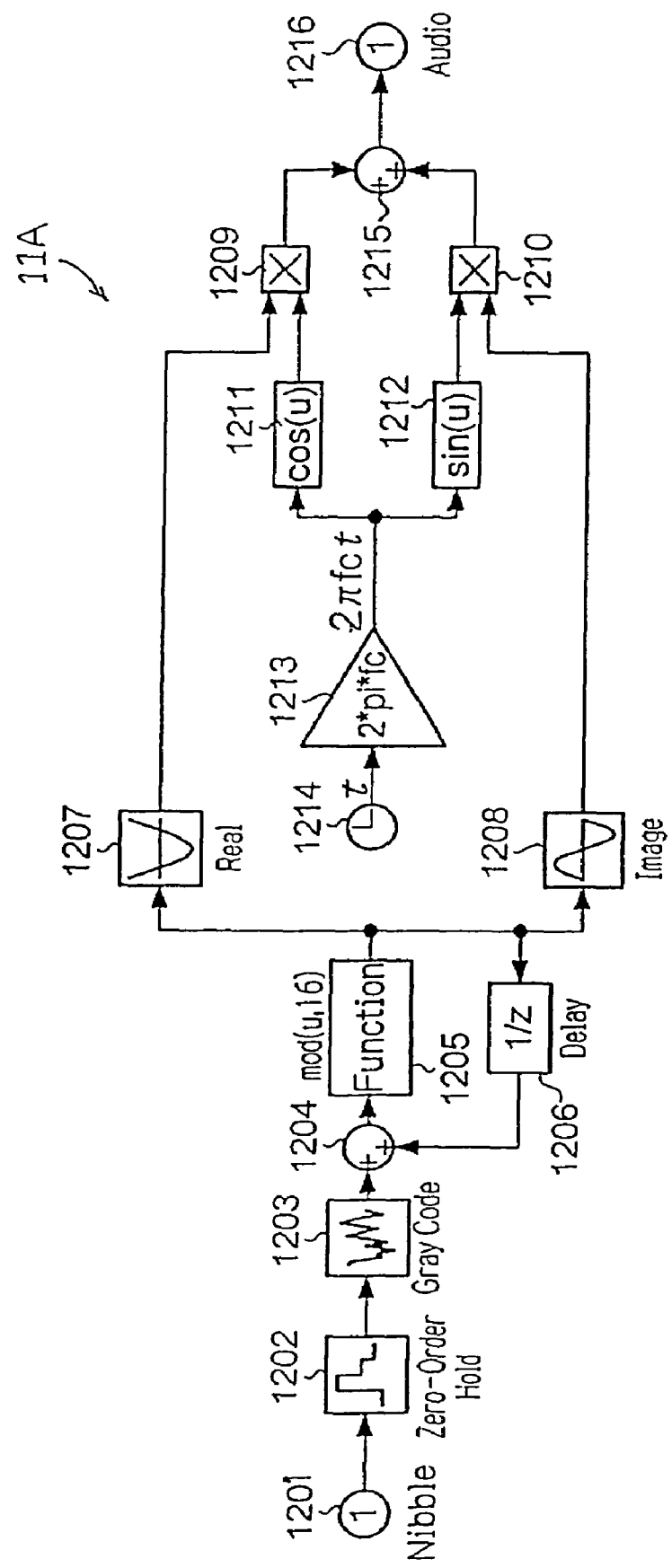
FIG. 34 is a block diagram showing the circuit configuration of a signal modulation module incorporated in the recording unit.
Figure 35:
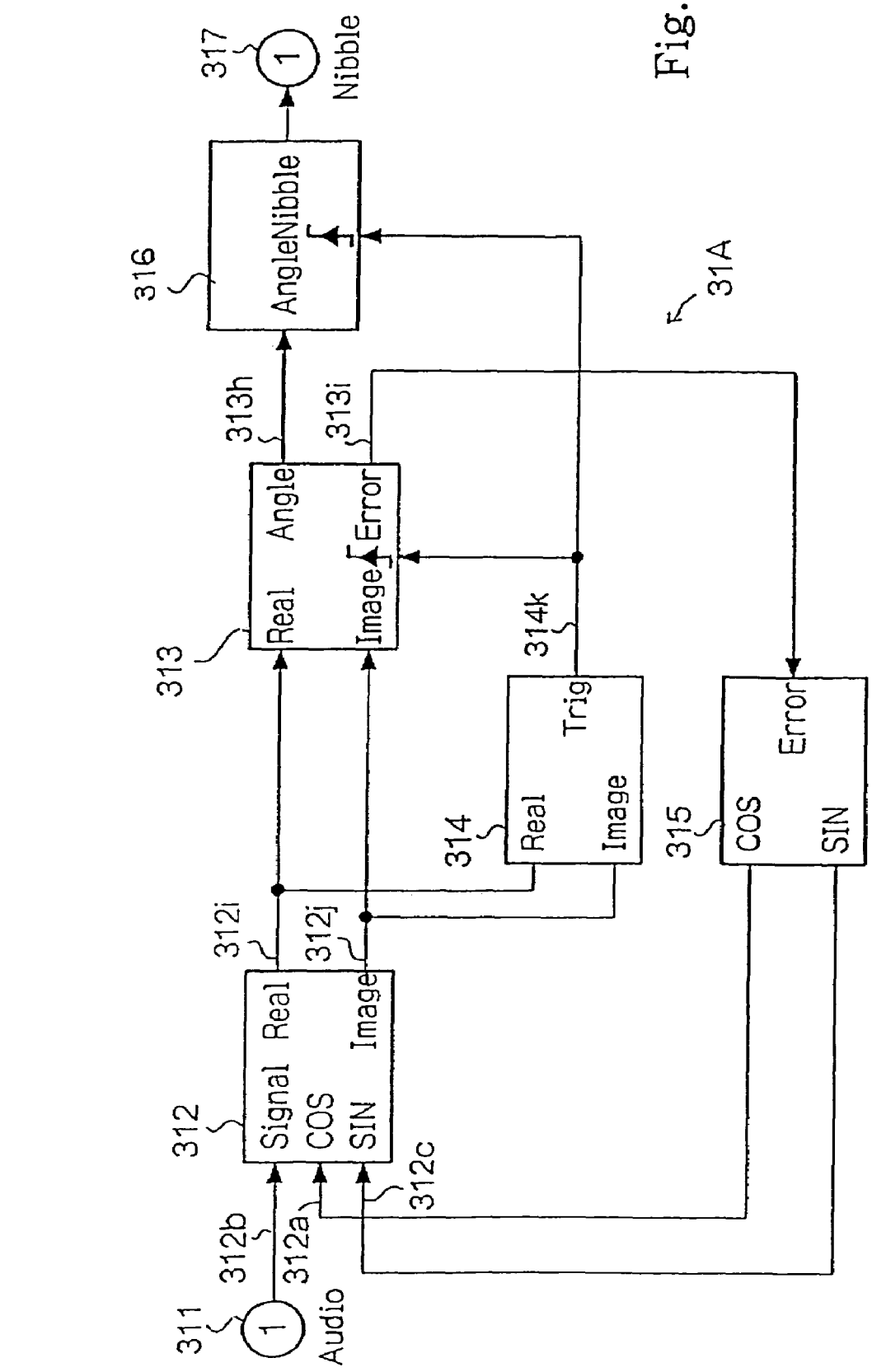
FIG. 35 is a block diagram showing the circuit configuration of a signal demodulation module incorporated in the playback unit.
Figure 36:
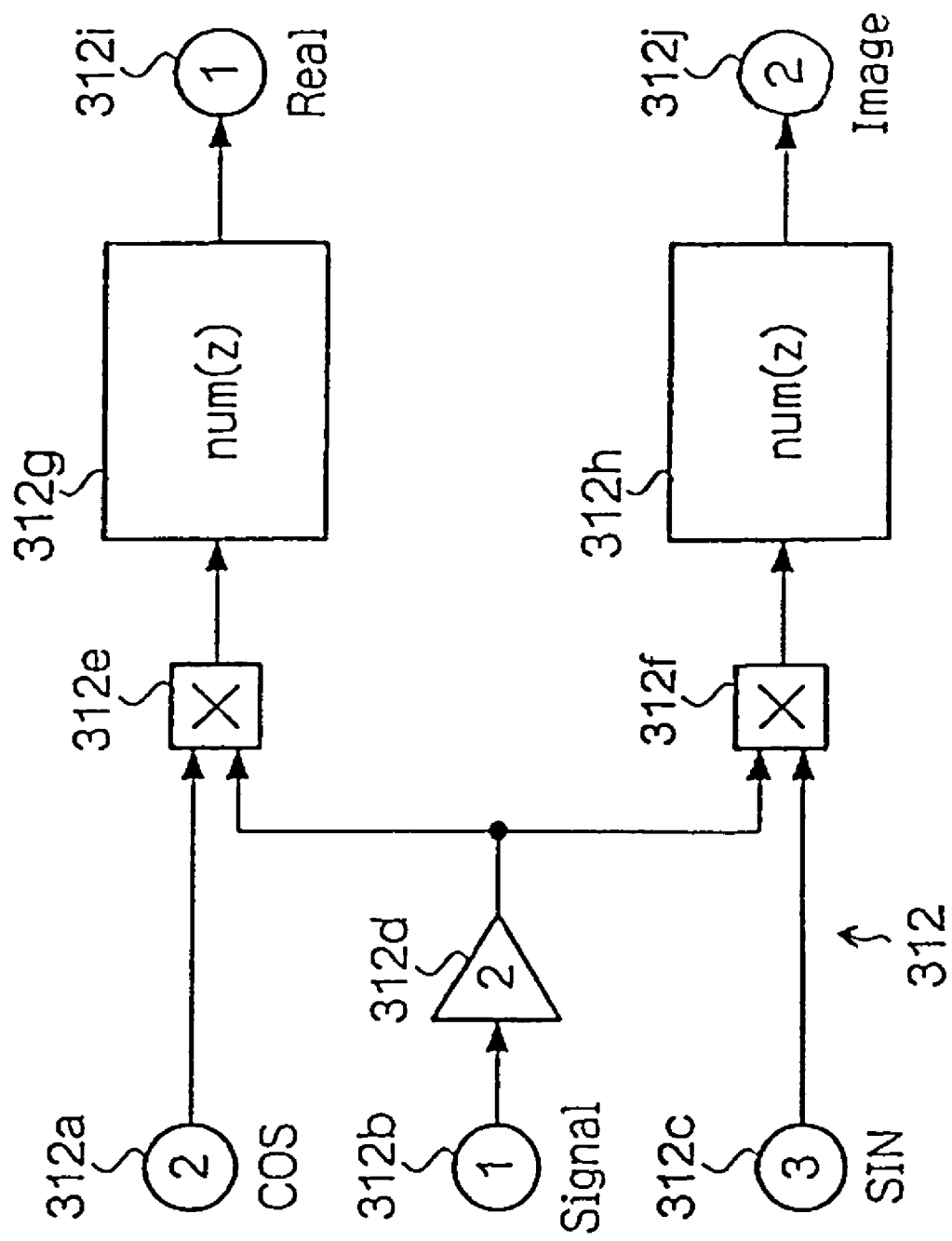
FIG. 36 is a block diagram showing the circuit configuration of a synchronous detector incorporated in the signal demodulation circuit.
Figure 37:
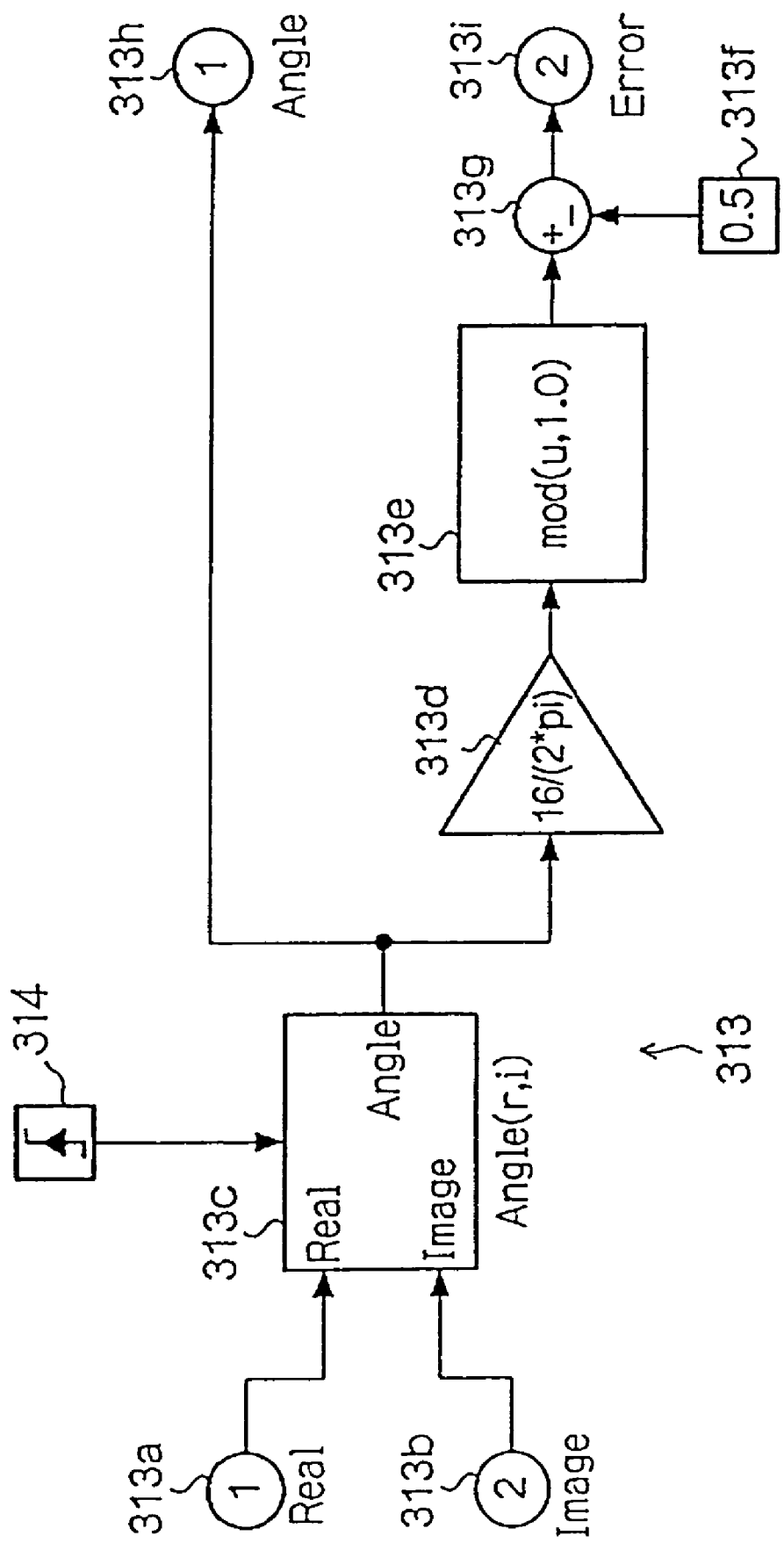
FIG. 37 is a block diagram showing the circuit configuration of a coordinate transformation circuit incorporated in the signal demodulation circuit.
Figure 38:
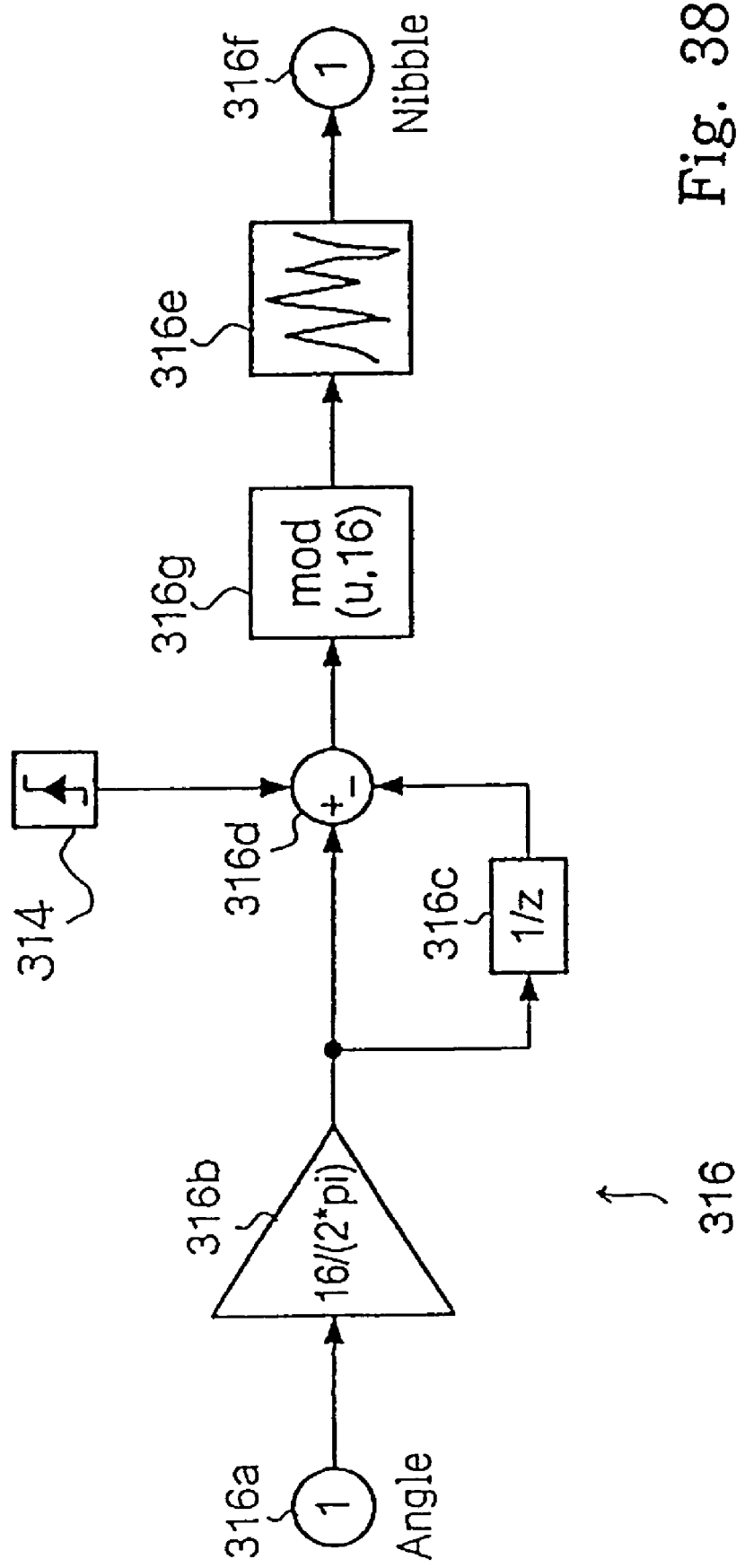
FIG. 38 is a block diagram showing the circuit configuration of a reverse mapping circuit incorporated in the signal demodulation circuit.
Figure 39:
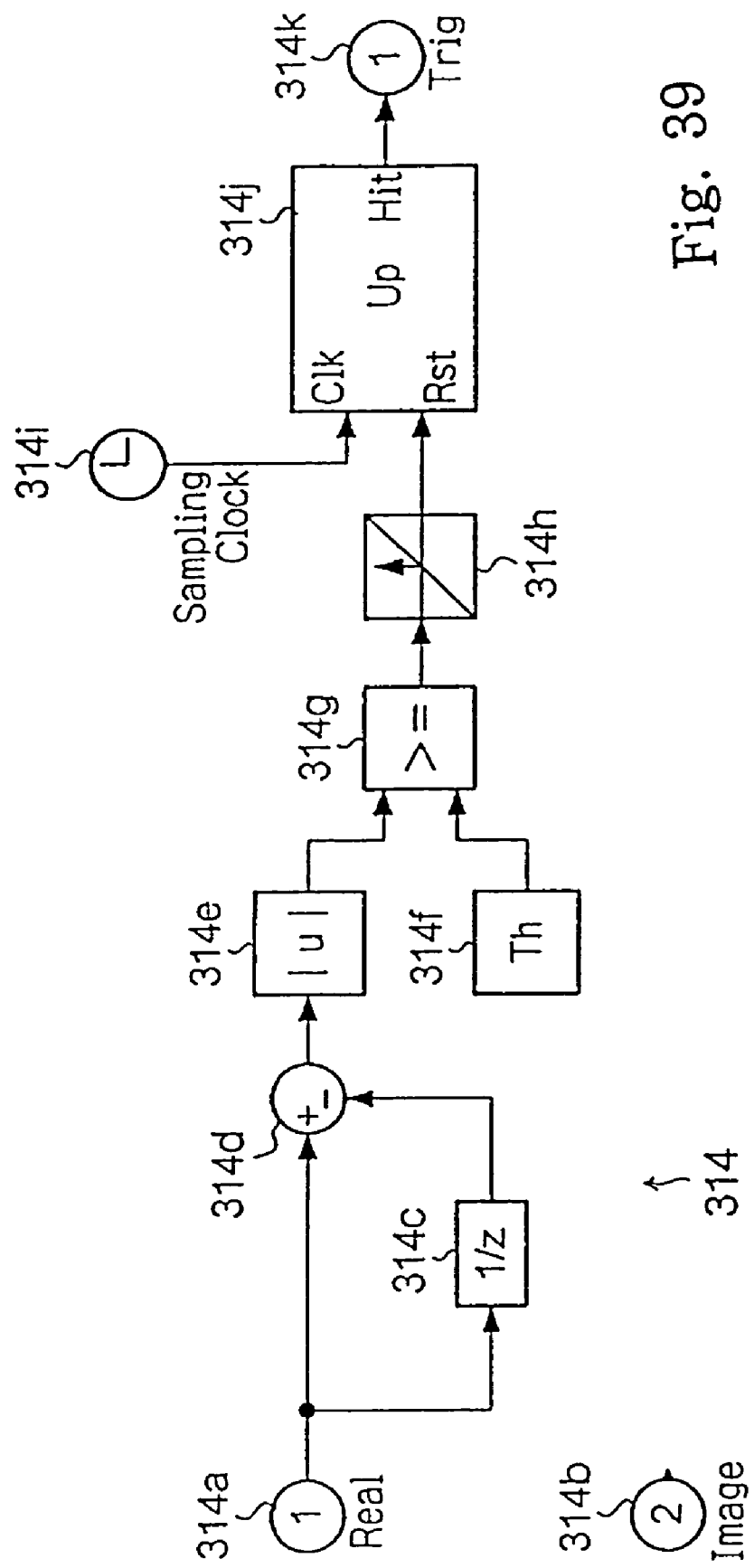
FIG. 39 is a block diagram showing the circuit configuration of a trigger signal generator incorporated in the signal demodulation circuit.
Figure 40:
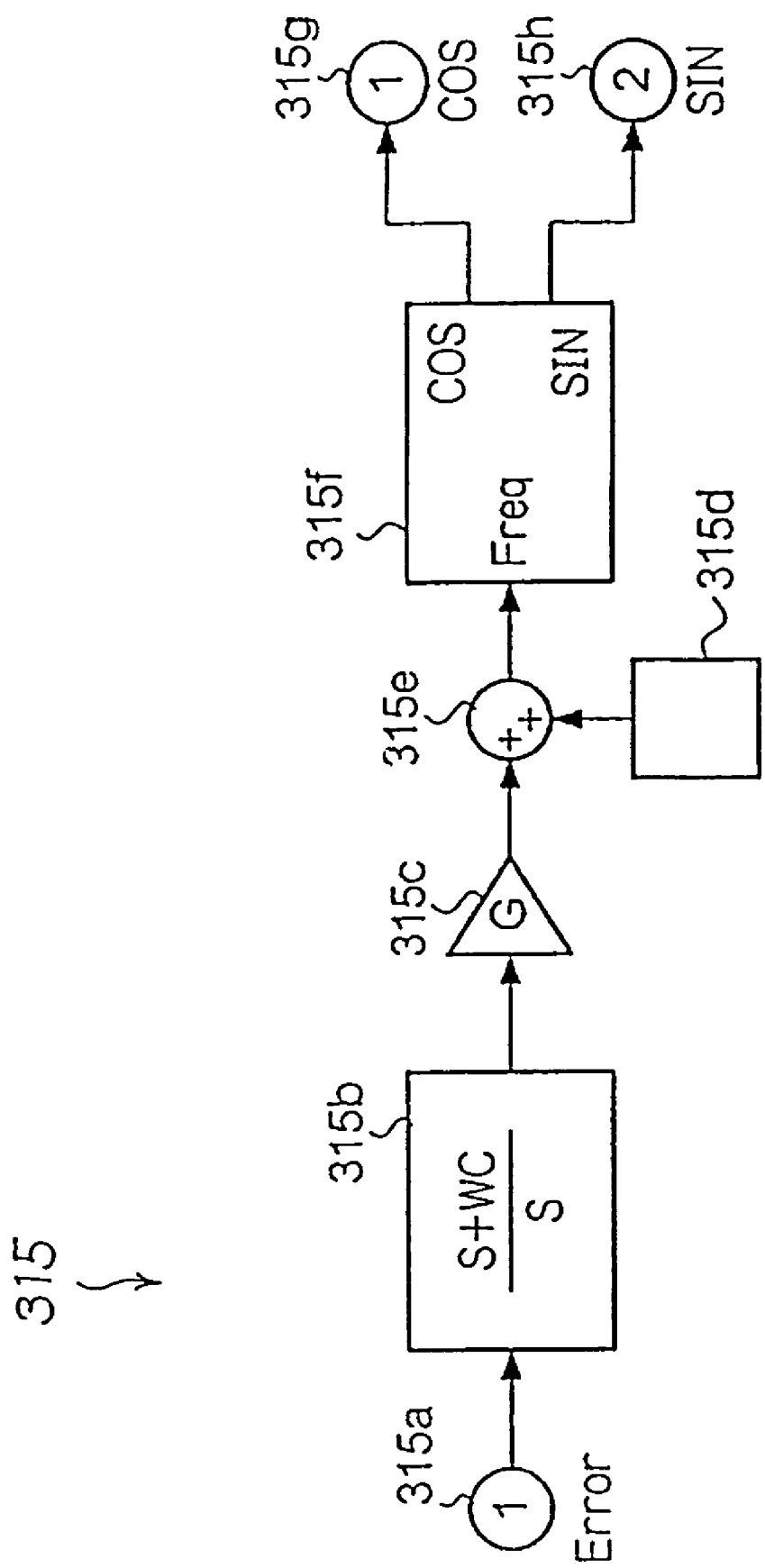
FIG. 40 is a block diagram showing the circuit configuration of a phase-locked loop incorporated in the signal demodulation circuit.

The signal modulation module 11A modulates the data stream DS1 through the 16 DPSK as similar to the signal modulation module 11. FIGS. 20 and 21 are also applied to the 16 DPSK carried in the signal modulation module 11A. The circuit configuration of the signal modulation module 11A and the circuit configuration of the signal demodulation module 31A are shown in FIGS. 34 and 35, respectively, and are similar to those of the signal modulation module 11 and the signal demodulation module 31. The synchronous detector 312, the coordinate transforming circuit 313, the reverse mapping circuit 316, the trigger signal generator 314 and the phase-locked loop 315 are incorporated in the signal demodulation module 31A, and are detailed in FIGS. 36, 37, 38, 39 and 40, respectively. Comparing FIGS. 36 to 40 with FIGS. 24 to 28, it is understood that those circuits 312, 313, 316, 314 and 315 are similar in circuit configuration to the synchronous detector 312, the coordinate transforming circuit 313, the reverse mapping circuit 316, the trigger signal generator 314 and the phase-locked loop 315 incorporated in the signal demodulation module 31. For this reason, no further description is hereinbelow incorporated for avoiding repetition.

Eve if the recording and reproducing system 1A is connected through the receiver 4A and the transmitter 5A to the public data network, the MIDI messages are recorded in the information storage medium 7A, and are reproduced therefrom.

Although particular embodiments of the present invention have been shown and described, it will be apparent to those skilled in the art that various changes and modifications may be made without departing from the spirit and scope of the present invention.

For example, a user may compose a tune on a display through a computer keyboard with the assistance of an appropriate computer program. In this instance, the personal computer system per se generates a set of MIDI music data words. The MIDI music data words may be supplied from the playback unit 3 to an automatic player piano or a silent piano.

The signal modulation is not limited to the 16 DPSK. A multi-value DPSK technique is available for the signal modulation. If a series of 3-bit data codes forms the data stream DS1, the data stream is converted to the analog audio data signal through 8 DPSK or 24 DPSK. Similarly, if a series of 2-bit data codes forms the data stream DS1, the data stream is converted to the analog audio data signal through 4 DPSK or 22 DPSK. The multi-value may be more than 2.

The spacious arrangement of gray codes may be different from that shown in FIG. 21 in so far as the relative phase is changed for a series of synchronous nibbles.

The MIDI music data words may be used for controlling an apparatus such as, for example, a stage lightning system or an image producing system.

Figure 41:
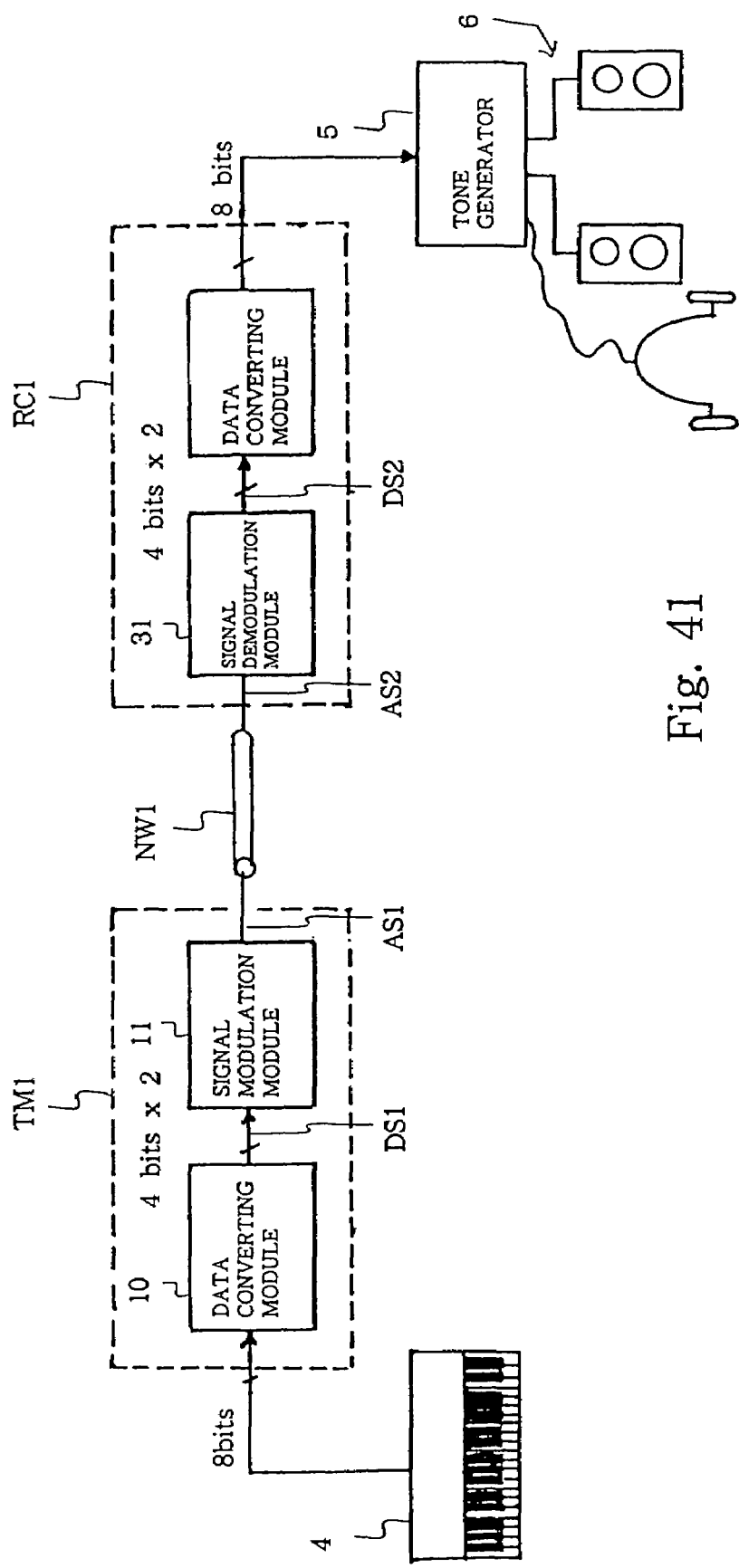
FIG. 41 is a block diagram showing a wire communication system.
Figure 42:
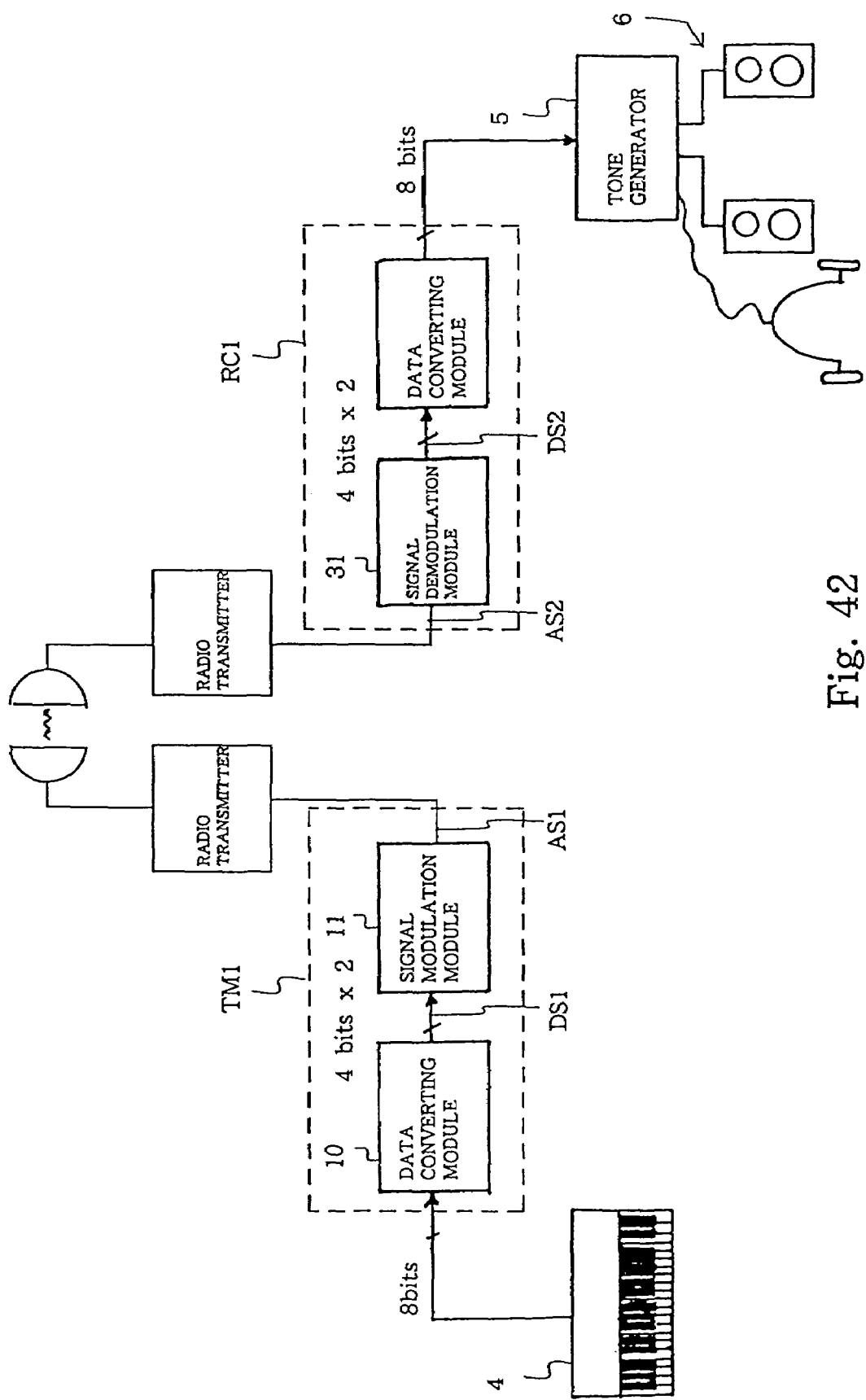
FIG. 42 is a block diagram showing a wireless communication system.

The analog audio data signal AS1 may be transferred from a transmitter TM1 to a receiver RC1 through a public telephone network NW1 as shown in FIG. 41. Otherwise, the analog audio data signal AS1 may be further modulated for the carrier band transmission as shown in FIG. 42.

What is claimed is:

1. A method for reproducing digital codes at irregular intervals from pieces of data information and pieces of meaningless information stored in an information storage medium, comprising the steps of:
    a) producing an analog data signal continuously varying a physical quantity from said pieces of data information and said pieces of meaningless information stored in said information storage medium;
    b) converting said analog data signal to a data stream containing said digital codes expressing discrete values of said physical quantity and synchronous data codes expressing a discrete value representative of said pieces of meaningless information through a demodulation technique corresponding to a modulation technique assigning values of said digital data codes to values of physical quantity that is periodically varied;
    said step b) includes the sub-steps of
        b-1) producing first signals representative of a series of coordinates in a quadrature coordinate system from said analog data signal,
        b-2) converting said series of coordinates in said quadrature coordinate system to a series of coordinates in a polar coordinate system so as to produce second signals from said first signal, and
        b-3) reversely mapping said series of coordinates in said polar coordinate system to said digital data codes and said synchronous data codes for producing said data stream; and
    c) eliminating said synchronous data codes from said data stream so as to leave said digital data codes representative of said pieces of data information at said irregular intervals.

2. The method as set forth in claim 1, in which said series of coordinates in said quadrature coordinate system are produced from said analog data signal through a synchronous detection.

3. The method as set forth in claim 1, in which said step c) includes the sub-steps of
  c-1) checking said data stream to see whether or not one of said synchronous data codes reaches,
  c-2) ignoring said one of said synchronous data codes when the answer in said step c-1) is given affirmative,
  c-3) checking one of said digital data codes to see whether or not the bit string has been changed to an alternate bit string without execution of said sub-step c-2) when said answer is given negative,
  c-4) restoring said bit string from said alternate bit string when the answer in said step c-3) is given affirmative, and
  c-5) passing said one of said digital data codes without execution of said sub-step c-4) when said answer in said sub-step c-3) is given negative.

4. A playback apparatus for producing digital data codes at irregular intervals from pieces of data information and pieces of meaningless information stored in an information storage medium, comprising:
  a signal demodulating unit supplied with an analog data signal continuously varying a physical quantity and carrying said pieces of data information and said pieces of meaningless information, producing a data stream containing said digital data codes expressing discrete values of said physical quantity and synchronous data codes expressing a discrete value representative of said pieces of meaningless information through a demodulation technique corresponding to a modulation technique assigning values of said digital data codes to values of a physical quantity that is periodically varied, and including
  a carrier signal restoring circuit for extracting wave components of a carrier signal on which said pieces of data information and said pieces of meaningless information ride from said analog data signal,
  a first data converter responsive to said wave components so as to produce data signals representative of a series of coordinates in a polar coordinate system from said analog data signal, and
  a second data converter converting said data signals to said data stream through a reverse mapping; and
  a data converter connected to said signal demodulating unit, and eliminating said synchronous data codes from said data stream so as to leave said digital data codes representative of said pieces of data information at said irregular intervals.

5. The playback apparatus as set forth in claim 4, in which said carrier signal restoring circuit includes
  a synchronous detector modulating said analog data signal for producing intermediate data signals representative of a series of coordinates in a quadrature coordinate system from said analog data signal,
  a coordinate transformer connected to said synchronous detector and carrying out a coordinate transformation for producing one of said data signals representative of an error component contained in angles stored in the other of said data signals from said intermediate data signals, and
  a phase-locked loop responsive to said one of said data signals for changing a frequency of said carrier signal.

6. The playback apparatus as set forth in claim 4, in which said first data converter includes
  a synchronous detector modulating said analog data signal for producing intermediate data signals representative of a series of coordinates in a quadrature coordinate system from said analog data signal, and
  a coordinate transformer connected to said synchronous detector and carrying out a coordinate transformation for producing one of said data signals representative of angles in said polar coordinate system.

* * * * *